US011113792B2

(12) United States Patent
Liu et al.

(10) Patent No.: US 11,113,792 B2
(45) Date of Patent: Sep. 7, 2021

(54) TEMPORAL-SPATIAL DENOISING IN RAY-TRACING APPLICATIONS

(71) Applicant: NVIDIA Corporation, San Jose, CA (US)

(72) Inventors: Shiqiu Liu, Santa Clara, CA (US); Jacopo Pantaleoni, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/540,946

(22) Filed: Aug. 14, 2019

(65) Prior Publication Data

US 2020/0058105 A1    Feb. 20, 2020

Related U.S. Application Data

(60) Provisional application No. 62/718,923, filed on Aug. 14, 2018.

(51) Int. Cl.
*G06T 5/20* (2006.01)
*G06T 5/00* (2006.01)
(Continued)

(52) U.S. Cl.
CPC .............. *G06T 5/002* (2013.01); *G06T 1/20* (2013.01); *G06T 5/20* (2013.01); *G06T 5/40* (2013.01);
(Continued)

(58) Field of Classification Search
CPC .. G06T 5/002; G06T 1/20; G06T 5/40; G06T 15/06; G06T 15/50; G06T 5/20; G06T 2207/20182
See application file for complete search history.

(56) References Cited

U.S. PATENT DOCUMENTS 5,384,869 A * 1/1995 Wilkinson ............ G06F 17/175
                                                375/240.01
5,808,620 A    9/1998 Doi et al.
(Continued)

FOREIGN PATENT DOCUMENTS

CN       102346919 B    8/2013
CN       106228599 A   12/2016
(Continued)

OTHER PUBLICATIONS

Nima Khademi Kalantari et al. "Removing the Noise in Monte Carlo Rendering with General Image Denoising Algorithms", Computer Graphics Forum, vol. 32, No. 2, May 7, 2013. pp. 93-102.
(Continued)

*Primary Examiner* — Sumati Lefkowitz
*Assistant Examiner* — Dalen O Goodson
(74) *Attorney, Agent, or Firm* — Shook, Hardy & Bacon L.L.P.

(57) ABSTRACT

Various approaches are disclosed to temporally and spatially filter noisy image data—generated using one or more ray-tracing effects—in a graphically rendered image. Rather than fully sampling data values using spatial filters, the data values may be sparsely sampled using filter taps within the spatial filters. To account for the sparse sampling, locations of filter taps may be jittered spatially and/or temporally. For filtering efficiency, a size of a spatial filter may be reduced when historical data values are used to temporally filter pixels. Further, data values filtered using a temporal filter may be clamped to avoid ghosting. For further filtering efficiency, a spatial filter may be applied as a separable filter in which the filtering for a filter direction may be performed over multiple iterations using reducing filter widths, decreasing the chance of visual artifacts when the spatial filter does not follow a true Gaussian distribution.

20 Claims, 11 Drawing Sheets

(51) Int. Cl.
    *G06T 1/20*      (2006.01)
    *G06T 5/40*      (2006.01)
    *G06T 15/06*     (2011.01)
    *G06T 15/50*     (2011.01)

(52) U.S. Cl.
    CPC .............. *G06T 15/06* (2013.01); *G06T 15/50* (2013.01); *G06T 2207/20182* (2013.01)

(56) References Cited

U.S. PATENT DOCUMENTS

| | | | |
|---|---|---|---|
| 6,028,608 | A | 2/2000 | Jenkins |
| 6,229,553 | B1 | 5/2001 | Duluk et al. |
| 6,310,982 | B1* | 10/2001 | Allred ............... H04N 5/21 348/E5.077 |
| 6,335,990 | B1 | 1/2002 | Chen et al. |
| 6,389,310 | B1* | 5/2002 | Demonceau ........... G06T 7/20 600/509 |
| 6,430,318 | B1 | 8/2002 | Florent et al. |
| 7,034,892 | B2 | 4/2006 | Ojo et al. |
| 7,199,838 | B2 | 4/2007 | Lin et al. |
| 8,130,244 | B2 | 3/2012 | Cooper |
| 8,139,059 | B2 | 3/2012 | Trepte |
| 8,264,546 | B2 | 9/2012 | Witt |
| 8,447,130 | B2 | 5/2013 | Chiu |
| 8,471,932 | B2 | 6/2013 | Cote et al. |
| 9,423,611 | B2 | 8/2016 | Yagi |
| 9,659,405 | B2 | 5/2017 | Wahrenberg |
| 9,778,815 | B2 | 10/2017 | Motta et al. |
| 9,871,948 | B2 | 1/2018 | Papadopoulos et al. |
| 9,892,549 | B2 | 2/2018 | Mitchell et al. |
| 9,961,319 | B2 | 5/2018 | Tajima |
| 10,740,954 | B2 | 8/2020 | Liu |
| 10,776,985 | B2 | 9/2020 | Liu et al. |
| 2004/0160441 | A1 | 8/2004 | Lokovic et al. |
| 2008/0174600 | A1 | 7/2008 | Xie |
| 2010/0134688 | A1 | 6/2010 | Moriwake |
| 2014/0192054 | A1 | 7/2014 | Yoo et al. |
| 2014/0313200 | A1 | 10/2014 | Tokuyoshi |
| 2015/0097975 | A1* | 4/2015 | Nash ................ G06T 5/002 348/208.1 |
| 2015/0131922 | A1 | 5/2015 | Simson |
| 2015/0208054 | A1 | 7/2015 | Michot |
| 2015/0325041 | A1 | 11/2015 | Ha et al. |
| 2015/0379763 | A1 | 12/2015 | Liktor et al. |
| 2016/0049000 | A1* | 2/2016 | Patney ................ G06T 1/20 345/426 |
| 2016/0171748 | A1 | 6/2016 | Kohlbrenner et al. |
| 2016/0260245 | A1 | 9/2016 | Decell et al. |
| 2016/0269723 | A1 | 9/2016 | Zhou et al. |
| 2016/0307324 | A1 | 10/2016 | Nakada et al. |
| 2016/0321785 | A1* | 11/2016 | Nishimura ........... A61B 1/0005 |
| 2017/0032500 | A1 | 2/2017 | Csefalvay |
| 2017/0243396 | A1 | 8/2017 | Kim et al. |
| 2017/0323471 | A1 | 11/2017 | Chien et al. |
| 2018/0096516 | A1* | 4/2018 | Luebke .............. G06T 15/06 |
| 2018/0114096 | A1 | 4/2018 | Sen et al. |
| 2018/0192497 | A1 | 7/2018 | Green et al. |
| 2018/0204307 | A1* | 7/2018 | Schied ................ G06T 5/20 |
| 2018/0255625 | A1 | 9/2018 | Lashina et al. |
| 2018/0293496 | A1 | 10/2018 | Vogels et al. |
| 2018/0315251 | A1 | 11/2018 | Sun et al. |
| 2019/0272626 | A1 | 9/2019 | Rhee et al. |

FOREIGN PATENT DOCUMENTS

| | | |
|---|---|---|
| CN | 104346831 B | 2/2017 |
| CN | 106485778 A | 3/2017 |
| EP | 2158948 A2 | 3/2010 |
| EP | 2058764 B1 | 9/2017 |
| JP | 2003331313 A | 11/2003 |
| KR | 101508386 B1 | 4/2015 |
| WO | 20182024435 A1 | 11/2018 |

OTHER PUBLICATIONS

Timo Viitanen et al. "Sparse Sampling for Real-time Ray Tracing", Proceedings of the 13th International Joint Conference on Computer Vision, Imaging and Computer Graphics Theory and Applications, Jan. 27, 2018 to Jan. 29, 2018, pp. 295-302.

Chakravarty R. Alla Chaitanya et al. "Interactive reconstruction of Monte Carlo image sequences using a recurrent denoising autoencoder", ACM Transactions on Graphics, ACM, 2 Penn Plaze, Suite 701, New York, NY 10121-0701, USA, vol. 36, No. 4, Jul. 20, 2017. pp. 1-12.

International Search Report and Written Opinion dated Jan. 31, 2020 in International Application No. PCT/US2019/046561 filed Aug. 14, 2019.

Notice of Allowance in U.S. Appl. No. 16/354,983 dated Apr. 9, 2020. 10 pages.

Ex Parte Quayle Office Action in U.S. Appl. No. 16/354,983 dated Feb. 25, 2020. 9 pages.

Notice of Allowance in U.S. Appl. No. 16/355,214 dated Apr. 22, 2020. 9 pages.

Ex Parte Quayle Office Action in U.S. Appl. No. 16/355,214 dated Mar. 9, 2020. 12 pages.

Dundr, Jan, "Progressive spatiotemporal variance-based path tracing filtering", May 2018, Master Thesis, Czech Technical University in Prague.

Mara, Michael, Morgan McGuire, Benedikt Bitterli, and Wojciech Jarosz. "An efficient denoising algorithm for global illumination." In High Performance Graphics, pp. 3-1. 2017.

Bauszat, P., Eisemann, M., John, S., & Magnor, M. (Feb. 2015). "Sample—based manifold filtering for interactive global illumination and depth of field." In Computer Graphics Forum (vol. 34, No. 1, pp. 265-276).

Schied, Christoph, Christoph Peters, and Carsten Dachsbacher. "Gradient Estimation for Real-Time Adaptive Temporal Filtering." Proceedings of the ACM on Computer Graphics and Interactive Techniques 1.2 (2018): 24.

Xu, Ruifeng, and Sumanta N. Pattanaik. "A novel Monte Carlo noise reduction operator." IEEE Computer Graphics and Applications 25, No. 2 (2005): 31-35.

Viitanen, T., Koskela, M., Immonen, K., Mäkitalo, M., Jääskeläinen, P., & Takala, J. (2018). "Sparse Sampling for Real-time Ray Tracing." In VISIGRAPP (1: GRAPP) (pp. 295-302).

Hees, H. "3D Computer Graphics." Mainz: Pediapress. Dipetik5 (2016). (uploaded in five parts).

Ritschel et al., "Shadows"—powerpoint available at http://chamilo2.grenet.fr/inp/courses/ENSIMAGWMM538N/document/Slides/4_en_Shadows.pptx.pdf.

Atty, Lionel, et al. "Soft shadow maps: Efficient sampling of light source visibility." Computer graphics forum. vol. 25. No. 4. Oxford, UK: Blackwell Publishing Ltd, 2006.

Tunnel, Raimond, Jaanus Jaggo, "Computer Graphics Learning—Shadows", Accessed Mar. 1, 2019 at: https://cglearn.eu/pub/computer-graphics/shadows.

Mehta, S. U., Wang, B., Ramamoorthi, R., & Durand, F. (2013). "Axis-aligned filtering for interactive physically-based diffuse indirect lighting." ACM Transactions on Graphics (TOG), 32(4), 96.

Mehta, Soham Uday, Brandon Wang, and Ravi Ramamoorthi. "Axis-aligned filtering for interactive sampled soft shadows." ACM Transactions on Graphics (TOG) 31.6 (2012): 163.

Salvi, Marco. An Excursion in Temporal Supersampling, NVIDIA Corporation, GDC16-San Francisco, Mar. 22, 2016, 56 pages.

Llamas, Ignacio St., et al. Ray Tracing in Games with NVIDIA RTX, NVIDIA Corporation, GDC 2018, Mar. 21, 2018, 81 pages.

Y Tokuyoshi: "Computer Graphics forum Specular Lobe-Aware Filtering and Upsampling for Interactive Indirect Ilumination", Jan. 1, 1981 (Jan. 1, 1981). pp. 1-12, XP055582445, Retrieved from the Internet: URL:http://www.jp.square-enix.com/tech/library/pdf/Specular%20Lobe-Aware%20Filtering%20and%20Upsampling%20for%20Interactive%20Indirect%20Illumination.pdf.

Soonhyun Kim et al: "Noiseless GPU rendering of isotropic BRDF surfaces", The Visual Computer; International Journal of Computer Graphics, Springer, Berlin, DE, vol. 28, No. 1, Sep. 13, 2011 (Sep.

(56) References Cited

OTHER PUBLICATIONS 13, 2011), pp. 125-135, XP019998749, ISSN: 1432-2315, DOI:10. 1007/S00371-011-0633-4 abstract, p. 130.
International Search Report and Written Opinion dated Apr. 30, 2019 in International Patent Application No. PCT/US2019/022577, 15 pages.
International Search Report and Written Opinion dated May 14, 2019 in International Patent Application No. PCT/US2019/022543, 12 pages.
International Preliminary Report on Patentability received for PCT Application No. PCT/US2019/022577, dated Oct. 1, 2020, 9 pages.
International Preliminary Report on Patentability received for PCT Application No. PCT/US2019/022543, dated Oct. 1, 2020, 9 pages.
Preinterview First Office Action dated Apr. 30, 2021 in U.S. Appl. No. 16/920,971, 42 pages.
Preinterview First Office Action dated May 14, 2021 in U.S. Appl. No. 16/935,431, 17 pages.
International Preliminary Report on Patentability received for PCT Patent Application No. PCT/US2019/046561, dated Feb. 25, 2021, 14 pages.
First Action Interview Office Action dated Jul. 2, 2021 in U.S. Appl. No. 16/920,971, 41 pages.
First Action Interview Office Action dated Jul. 26, 2021 in U.S. Appl. No. 16/935,431, 17 pages.

\* cited by examiner

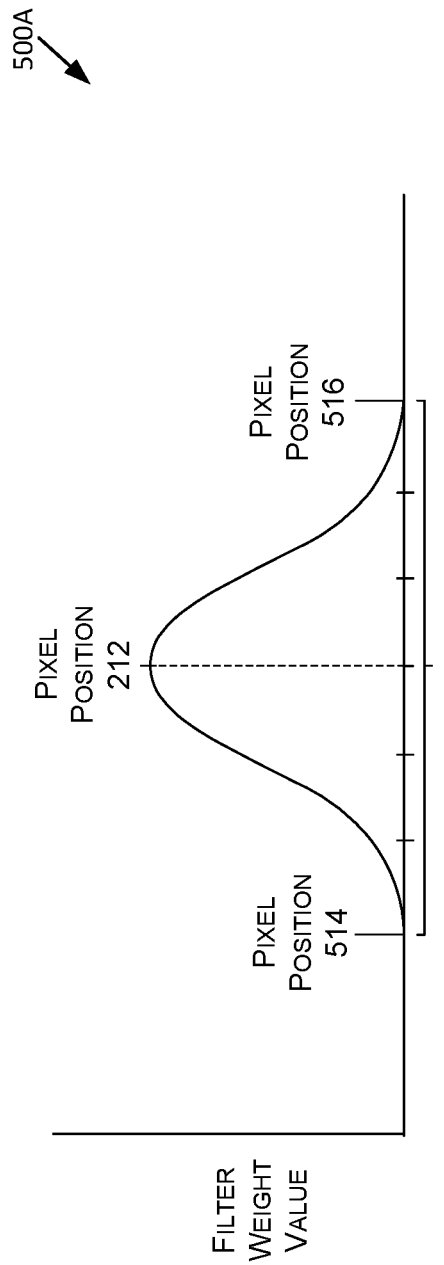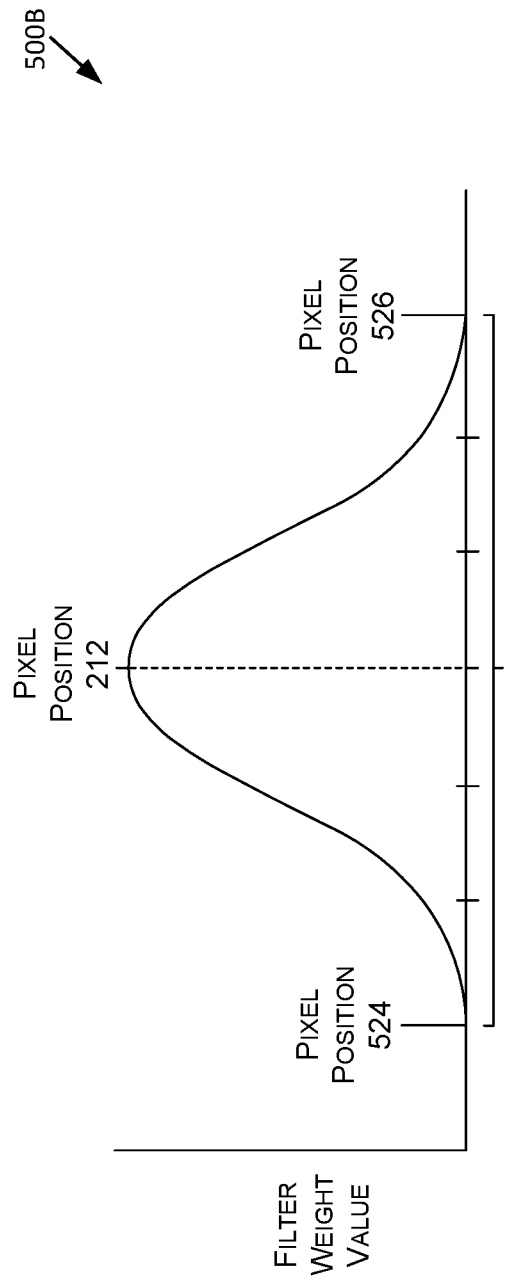

TEMPORAL-SPATIAL DENOISING IN RAY-TRACING APPLICATIONS

CROSS-REFERENCE TO RELATED APPLICATIONS

This application claims the benefit of U.S. Provisional Application No. 62/718,923, filed on Aug. 14, 2018, which is hereby incorporated by reference in its entirety. This application is related to co-pending U.S. Non-provisional application Ser. No. 16/530,854, filed on Aug. 2, 2019, which is likewise hereby incorporated by reference in its entirety.

BACKGROUND

Ray-tracing is a technique used in image rendering applications that is performed by tracing a path of light in a virtual environment and simulating the effects of the light's encounters with virtual objects. Ray-tracing technology may be used to simulate a variety of optical effects—such as shadows, reflections and refractions, scattering phenomenon, and dispersion phenomenon (such as chromatic aberration). Conventional approaches to rendering ray-tracing effects use stochastic ray-tracing in which ray-traced camera and secondary rays are cast in a virtual environment to sample lighting conditions for a pixel. The sampled lighting conditions may be combined and applied to the pixel in an image. To conserve computing resources, the rays are often sparsely sampled, which can result in a noisy render. The noisy render may then be filtered to reduce noise and produce a final render that approximates a render of a fully sampled scene.

In order for the final render to accurately portray lighting conditions in the virtual environment after filtering, conventional approaches require a large number of ray-traced samples (e.g., hundreds of samples or more) for each pixel. Due to the large number of samples, the computational resources used for rendering the virtual environment may be too great to be performed sufficiently quickly for real-time rendering applications, such as gaming. A conventional system may use historical pixels values from prior images to assist in the rendering. However, these approaches to using the historical pixel values may still contribute to render time and may result in ghosting and/or other undesired visual artifacts when lighting conditions change rapidly.

Other approaches use generic spatial filters to denoise lighting condition data. However, these spatial filters result in lower quality renders. For example, these conventional systems assume all of the spatial filters are axis-aligned in the horizontal and vertical directions of the screen and are isotropic (e.g., circular), allowing for the spatial filters to be applied in the same horizontal and vertical passes. This fails to account for the directional nature of light in a scene, which may vary per pixel. Additionally, the conventional system assumes the filter kernel of each spatial filter for a pixel follows a true Gaussian distribution centered at the pixel. This allows the spatial filter to be applied separably using a horizontal pass and a vertical pass that are collectively equivalent to applying the spatial filter non-separably in a single pass. However, it may be desirable to use a filter kernel that does not follow a true Gaussian distribution in order to enhance the accuracy of a spatial filter, in which case applying the spatial filter separably may not be equivalent to applying the spatial filter non-separably.

SUMMARY

Embodiments of the present disclosure relate to temporal-spatial denoising in ray-tracing applications. In particular, the present disclosure relates to approaches for denoising lighting condition data generated using ray-tracing effects. More specifically, the current disclosure relates to approaches for temporally and spatially filtering image data—generated using one or more ray-tracing effects—in a graphically rendered image.

Disclosed approaches to denoising ray-traced images may use spatial filters in addition to temporal filters that sample historical pixel values. To more efficiently denoise an image—rather than fully sampling data values using spatial filters—the data values may be sparsely sampled using filter taps that are dispersed within the spatial filters. To account for the sparse sampling, locations of filter taps may be jittered (e.g., selected randomly or pseudo-randomly) spatially (e.g., between spatial filters applied to a current frame) and/or jittered temporally (e.g., between spatial filters applied to different frames). Further, a size of a spatial filter that is applied to pixels may be computed based at least in part on a count of historical data values applied to the pixels using one or more temporal filters. This may reduce the size when more historical data values are used, and as a result, reduce the computational requirements of filtering. To reduce or eliminate ghosting and other artifacts that may result from temporal filtering, filtered data values may be clamped to the mean and variance of data values from a region of the current image. Additionally, for efficiency, a spatial filter for a pixel may be applied as a separable filter in which the filtering for a filter direction may be performed over multiple iterations using reducing filter widths—rather than in a single pass using the filter width of the spatial filter. This may allow lighting conditions in a region around the pixel to be shared with additional pixels, reducing the chance of visual artifacts when the spatial filter does not follow a true Gaussian distribution.

BRIEF DESCRIPTION OF THE DRAWINGS

The present systems and methods for temporal-spatial denoising in ray-tracing applications is described in detail below with reference to the attached drawing figures, wherein:

FIG. 5A is a diagram illustrating an example of a graph of filter weight values that may be determined by fitting a distribution function to a width of a spatial filter along a filter direction, in accordance with some embodiments of the present disclosure;

FIG. 5B is a diagram illustrating an example of a graph of filter weight values that may be determined by fitting a distribution function to another width of the spatial filter of FIG. 5A along another filter direction, in accordance with some embodiments of the present disclosure;

DETAILED DESCRIPTION

Figure 1A:
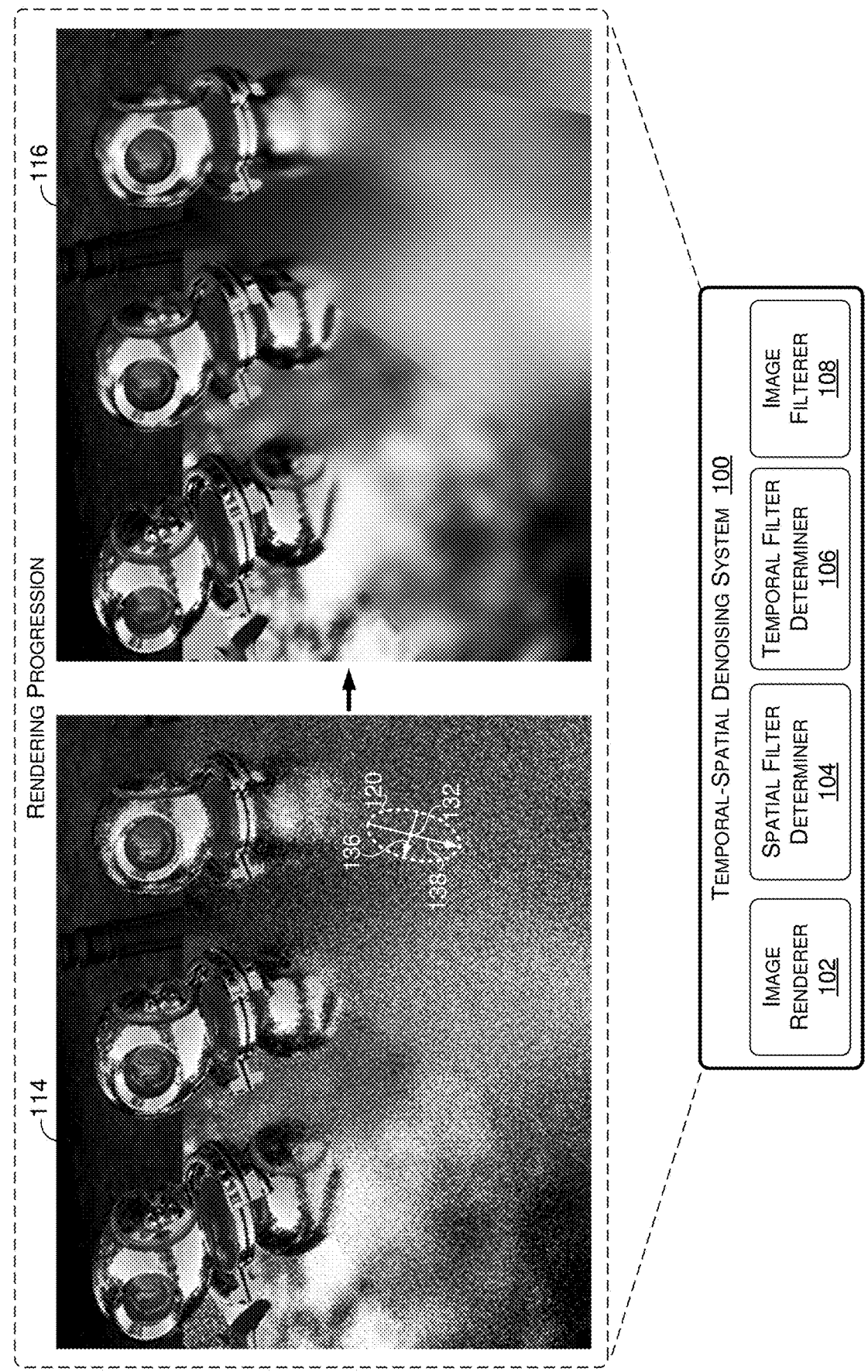
FIG. 1A is an example system diagram of a temporal-spatial denoising system, in accordance with some embodiments of the present disclosure.

The present disclosure relates to temporal-spatial denoising in ray-tracing applications. In particular, the present disclosure relates to approaches for denoising lighting condition data generated using ray-tracing effects. More specifically, the current disclosure relates to approaches for temporally and spatially filtering image data—generated using one or more ray-tracing effects—in a graphically rendered image.

Disclosed approaches to denoising ray-traced images include approaches for temporally and spatially filtering image data—generated using one or more ray-tracing effects—in a graphically rendered image. Various combinations of these approaches may be used to reduce render time, which may enable real-time rendering applications, such as gaming, while still producing high quality renders that accurately portray lighting conditions in a scene.

While some of the disclosed denoising techniques may be used with isotropic spatial filters to denoise ray-traced lighting condition data, disclosed approaches may employ anisotropic spatial filters (e.g., elliptical) which reflect the directional nature of light in a scene. This may not only reduce the chance of over-blurring of an image, but also result in a more realistic blur pattern. Due to the accuracy of the anisotropic spatial filters, a final render may accurately portray lighting conditions in a virtual environment after filtering using a small number of ray-traced samples for each pixel (e.g., a single sample per pixel). However, because all of the spatial filters may not be axis-aligned in the horizontal and vertical directions of the screen and may not all be isotropic (e.g., circular), the spatial filters may not all be applied in the same horizontal and vertical passes. Disclosed approaches may be used to reduce the computational requirements for applying anisotropic spatial filters and/or isotropic spatial filters, which may reduce render times and enable real-time rendering applications.

To more efficiently denoise an image, rather than fully sampling data values using spatial filters, the data values may be sparsely sampled using filter taps that are dispersed within the spatial filters. To account for the sparse sampling, locations of filter taps may be jittered (e.g., selected randomly or pseudo-randomly) spatially (e.g., between spatial filters applied to a current frame) and/or temporally (e.g., between spatial filters applied to different frames). By jittering filter taps temporally and/or spatially, a spatial filter may be sparsely sampled to reduce computational requirements, while still producing accurate results. In some examples, temporal filters may be applied after the spatial filters to further enhance the temporal stability of the spatial filters.

The disclosure further provides approaches for more efficiently denoising an image where one or more temporal filters are used to filter lighting condition data for pixels with a spatial filter. In disclosed approaches, a size of the spatial filter may be computed based at least in part on a count of historical data values applied to the pixels using the temporal filter(s) to reduce the size when more historical data values are used. A smaller spatial filter will generally have lower computational requirements to apply. As the temporal filter(s) may increase the effective sample count of the spatial filter, a smaller spatial filter may be used while still producing accurate filtered results.

The disclosure further provides approaches for reducing or eliminating ghosting and other artifacts that may result from temporal filtering. To do so, when applying a temporal filter, filtered data values may be clamped to the mean and variance of data values from the current image or frame. To clamp a data value for a pixel, the mean and variance may be computed from a window of pixels around the pixel. To conserve processing power, the mean and variance may be estimated, such as by sparse sampling and tapping the window.

The disclosure also provides approaches for accurately and efficiently applying a spatial filter for a pixel as a separable filter, even where the spatial filter does not follow a true Gaussian distribution centered at the pixel (e.g., the spatial filter may be a bilateral filter). For example, filter weights may be determined using one or more factors in addition to or instead of a Gaussian distribution, resulting in more accurate filtering. In disclosed approaches, in applying a filter kernel as a separable filter, the filtering for a filter direction may be performed over multiple iterations using reducing filter widths—rather than in a single pass using the filter width of the spatial filter. This may allow lighting conditions in the region around the pixel to be shared with additional pixels when the separable filter is not equivalent to the filter kernel. Thus, the chances of visual artifacts occurring may be reduced.

With reference to FIG. 1, FIG. 1 is an example system diagram of a temporal-spatial denoising system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the temporal-spatial denoising system 100 may be implemented on one or more instances of the computing device 1000 of FIG. 10.

The temporal-spatial denoising system 100 may include, among other elements, an image renderer 102, a spatial filter determiner 104, a temporal filter determiner 106, and an image filterer 108. The image renderer 102 may be configured to render images of virtual environments (also referred to as scenes), such as a virtual environment 200 of FIG. 2. To render an image of a virtual environment, the image renderer 102 may employ the spatial filter determiner 104, the temporal filter determiner 106, and the image filterer 108. The spatial filter determiner 104 may be configured to determine—for a point in the virtual environment and/or one or more pixels for a rendered image—a spatial filter and corresponding filter weights of the spatial filter (e.g., a spatial filter(s) 120 of FIGS. 1A and 1B or a spatial filter(s) 142 of FIG. 1B). The temporal filter determiner 106 may be configured to determine—for the point in the virtual environment and/or the pixel(s)—a temporal filter and corresponding filter weights of the temporal filter (e.g., a temporal filter(s) 126, a temporal filter(s) 130, a temporal filter(s) 140, or a temporal filter(s) 144, each shown in FIG. 1B). The image filterer 108 may apply the spatial filter(s) and the temporal filter(s) to the pixel(s)—such as a pixel 132 (e.g., at an initial pixel position of the filter)—to denoise image data representative of the image 114 of the virtual environment. The image renderer 102 may similarly use the spatial filter determiner 104 and the temporal filter determiner 106 to determine filters for other points in the virtual environment and/or corresponding pixels of the image 114 to produce the image 116. Thus, multiple filters may be used to denoise lighting condition data associated with the image 114 to produce the image 116 (e.g., at least one filter per pixel), and multiple filters may be applied—at least partially—in a same pass using any suitable number of passes.

While the image renderer 102 is described as rendering the image 114, examples described herein are not limited to rendering. For example, the image 114 need not be fully rendered as shown. As an example, one or more portions of visual content of the image 114 and/or components thereof may be rendered (e.g., incoming radiance, etc.). The image filterer 108 may apply spatial and/or temporal filters to image data representative of the one or more portions of visual content of the image 114 and/or components thereof to produce image data representative of the image 116. The image 114 is shown to illustrate noise in lighting condition data that may be filtered in some examples of the present disclosure. Further, while the spatial filter 120 is illustrated in FIG. 1A, it is shown for illustrative purposes.

Figure 2:
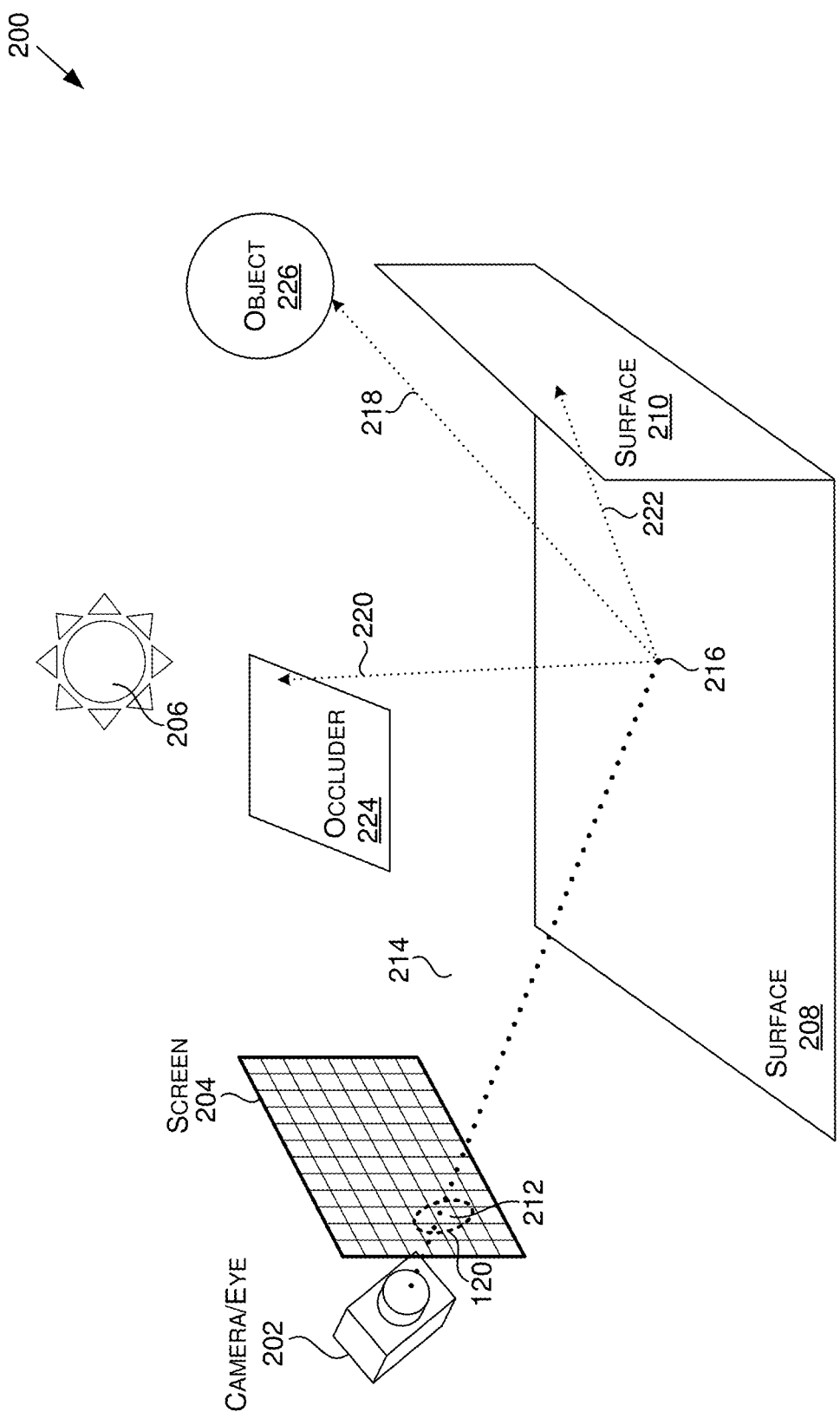
FIG. 2 is a diagram illustrating an example of a virtual environment with rays, which may be used to determine lighting condition data using ray-tracing effects, in accordance with some embodiments of the present disclosure.

The image renderer 102 may render the image 114 (and/or portions or components thereof) using any suitable approach for ray-tracing, such as stochastic ray-tracing. Examples of stochastic ray-tracing techniques that may be used by the image renderer 102 include those that employ Monte Carlo or quasi-Monte Carlo sampling strategies. FIG. 2 is used to further describe examples of suitable ray-tracing approaches that may be employed by the image renderer 102 to render an image using ray-tracing. FIG. 2 provides examples of how the image renderer 102 may render ray-traced shadows, ray-traced reflections, ray-traced ambient occlusions, or ray-traced global illuminations. However, other approaches may be used to render these ray-tracing effects and other types of rendered ray-tracing effects are contemplated as being within the scope of the present disclosure.

FIG. 2 shows the virtual environment 200 including a camera 202, a screen 204, an object 226, a surface 208, a surface 210, and an occluder 224. The screen 204 may be a virtual representation of a screen that may or more not be the same resolution as the image 114 and/or the image 116. The screen 204 may include a matrix of virtual pixels or regions, of which a pixel 212 is individually labeled. To determine at least some lighting condition data for the pixel 212 (e.g., corresponding to the pixel 132 of FIG. 1A), the image renderer 102 may cast any number of rays (e.g., one or more)—such as a ray 214—through the pixel 212 of the screen 204 to sample lighting conditions for the pixel 212. These rays may be referred to as camera rays, eye rays, view vectors, or primary rays, as examples. The image renderer 102 may use the camera rays to determine visible points in the environment that may be affected by at least one light source such as the light source 206. For example, the image renderer 102 may use the ray 214 to determine a point 216 on or near the surface 208. This may include the image renderer 102 determining the point 216 as the location where the ray 214 intersects with the surface 208 (or the point 216 may otherwise be based at least in part on that location). Although the ray 214 intersects with the surface 208, in examples where more than one ray is cast, not all rays may intersect with a surface.

In any example, rays—such as the ray 214 and the ray 218—may be used to test the visibility a point (e.g., the point 216) with respect to the camera 202 and/or the object 226, and a filter (e.g., the spatial filter 120) may only be determined for points that are determined to be visible.

From each point in the virtual environment 200 that the image renderer 102 determines using a ray cast through the pixel 212, any number of rays (e.g., one or more) may be cast to model the ray-tracing effect(s) for the point 216. For example, to render ray-traced reflections, any number of rays (e.g., one or more)—such as a ray 218—may be cast to model a reflection of the ray 214 at the point 216. Various approaches may be used to model the reflection of the ray 214, an example of which is provided herein. The image renderer 102 may determine the direction of the ray 218 based at least in part on a normal of the surface 208 at the point 216. For example, the image renderer 102 may define a Normal Distribution Function (NDF) for the point 216 based at least in part on the normal of the surface 208 at the point 216. The image renderer 102 may use the NDF, the ray 214, and a roughness value of the surface 208 that is associated with the point 216 to define a bidirectional reflectance distribution function (BRDF) lobe (e.g., when using a glossy microfacet BRDF model). For example, the NDF may be defined using a function (the NDF) that defines a likelihood of a microfacet being aligned in a particular direction. The BRDF lobe may be defined using a function (the BRDF) that uses the NDF as a weighting function to scale the brightness of reflections. The image renderer 102 may sample the BRDF lobe (e.g., stochastically using the BRDF or using another sampling strategy) to determine the ray 218. These rays may be referred to as reflected rays, or secondary rays, as examples. Although the ray 218 intersects with the object 226, in examples where more than one ray is cast, not all rays may intersect with the object 226. For example, a ray may intersect with a different object or may not intersect with any object.

To render ray-traced shadows, any number of rays (e.g., one or more)—such as a ray 220—may be cast to sample visibility and lighting conditions of the point 216 with respect to the light source 206. These rays may be referred to as shadow rays, or secondary rays, as examples. The image renderer 102 may sample the visibility of the light source 206 (e.g., stochastically or using another sampling strategy) to determine the ray 218. Although the ray 218 intersects with the occluder 224, in examples where more than one ray is cast, not all rays may intersect with the occluder 224. In some examples, one or more shadow rays may be cast for each light source in the virtual environment 200 to determine a contribution of the light source to the lighting conditions for a pixel.

To render ray-traced ambient occlusions or global illuminations, any number of rays (e.g., one or more)—such as a ray 222—may be cast to sample visibility and lighting conditions of the point with respect to the light source 206 (e.g., stochastically or using another sampling strategy). These rays may be referred to as occlusion rays, or secondary rays, as examples.

The various rays (e.g., the ray 214, the ray 218, the ray 220, or the ray 222) may be used by the image renderer 102 to determine ray-traced samples of lighting conditions for the pixel 212. For example, the rays may form at least portions of any number of virtual light paths between the pixel 212 and one or more light sources and/or other objects, examples of which may include the ray 214, the ray 218, the ray 220 and/or the ray 222. The object 226 may be an example of such a light source, or the object 226 may be another type of object, such as a non-light emitting reflective object. Where the object 226 is not a light source, the virtual light path involving the ray 218 may further include one or more rays to a light source. The image renderer 102 may determine at least some lighting condition data for the pixel 212 by combining the lighting condition data derived from the various ray-traced samples. The image renderer 102 may similarly determine at least some lighting condition data for each pixel or region of the screen 204 (e.g., using any number of shadow rays and camera rays).

The rays 218, 220, and 222, which are described as being used to simulate different ray-tracing effects for the pixel 212, are also described as being cast from the same point 216 determined using the same ray 214. However, the various ray-tracing effects may be simulated using different points in the virtual environment 200 and/or rays (e.g., primary rays) through the pixel 212. The image renderer 102 may use the lighting condition data for each virtual pixel to render one or more corresponding pixels of the image 116. Generally, the accuracy of the lighting conditions that the image renderer 102 computes for a pixel using a ray-tracing effect may increase with the number of camera rays and/or secondary or subsequent rays used to sample the lighting conditions. However, the computing resources used to determine the lighting conditions also may increase with the number of rays, which may increase render times.

To preserve computing resources and to reduce render times, the number of rays used to sample lighting conditions may be less than what is necessary for the quality of the ray-tracing effect(s) to converge to ideal ray-traced results. This may result in the image renderer 102 generating lighting condition data that includes noisy image data, as indicated in the image 114. The image 114 illustrates an example of noisy image data generated for ray-traced reflections. In this example, the lighting conditions of each pixel of the screen 204 with respect to the object 226 is based on a single ray-traced sample of a state of the virtual environment 200 (e.g., comprising a single camera or eye ray and a single reflected ray per incident ray). However, noisy image data may similarly be generated using other ray-tracing effects, such as for ray-traced shadows, global illuminations, and/or ambient occlusions.

To reduce noise in the lighting condition data for the pixels, the image renderer 102 may filter the lighting condition data to render the image 116. These filters may include one or more spatial filters determined by the spatial filter determiner 104 and/or one or more temporal filters determined by the temporal filter determiner 106. A spatial filter may filter render data for a pixel(s) for a frame or image using render data of neighbor pixels that corresponds to the frame and/or image, such as at a common time and/or state of the virtual environment 200. Render data may refer to data representative of ray-traced samples used to render a scene, such as lighting condition data (e.g., rendered pixel color data and/or one or more components thereof), hit distance data, or visibility data. A temporal filter may filter render data of the pixel(s) for a frame or image using render data of neighbor pixels that corresponds to one or more previously rendered frames and/or images, such as at different prior times and/or states of the virtual environment 200. For example, a spatial filter used to render the image 116 may be applied using render data of pixels corresponding to a state of the virtual environment 200 captured by the image 114, whereas a temporal filter used to render the image 116 may be applied using render data of pixels corresponding to one or more states prior to the state of the virtual environment 200 captured by the image 114.

Figure 1B:
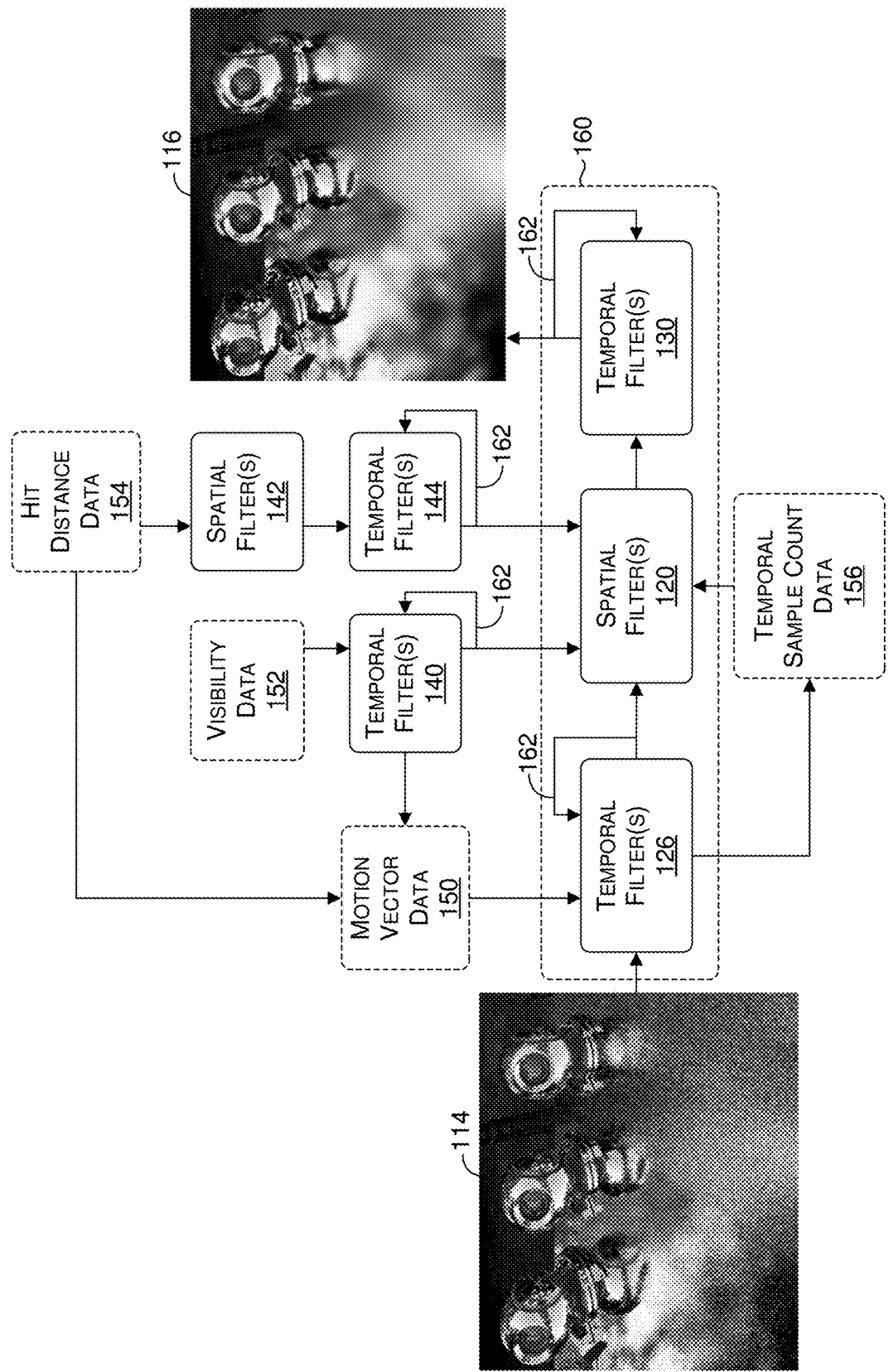
FIG. 1B is a diagram illustrating a process for filtering lighting condition data that includes noisy image data for a pixel, in accordance with some embodiments of the present disclosure.

Referring now to FIG. 1B, FIG. 1B is a diagram illustrating a process 160 for filtering noisy lighting condition data for a pixel (e.g., the pixel 212 and/or the pixel 132) to render a state of a virtual environment, in accordance with some embodiments of the present disclosure. The process 160 may be performed for each pixel being rendered and may be repeated to render each state of the virtual environment over time (e.g., on a per-frame basis).

The process 160 may operate on ray-traced samples of lighting condition data (e.g., corresponding to the image 114), which may be determined by the image renderer 102 for the state of the virtual environment using the approaches described with respect to FIG. 2, or other approaches. To render the state of the virtual environment, the process 160 may filter the lighting condition data for each ray-tracing effect(s) to denoise noisy image data that corresponds to that ray-tracing effect(s). For example, to render a frame (e.g., corresponding to the image 116), in respective instances of the process 160, a spatial filter determiner 104 (of FIG. 1A) may determine and use a different spatial filter 120 for each ray-tracing effect to denoise noisy image data that corresponds to that ray-tracing effect (e.g., in parallel). Further, to render the frame, a temporal filter determiner 106 (of FIG. 1A) may determine a different temporal filter 126 and/or 130 for each ray-tracing effect in the respective instances of the process 160 to denoise noisy image data that corresponds to that ray-tracing effect (when temporal filters are employed). The process 160 may be performed on lighting condition data for ray-traced shadows, ray-traced reflections, ray-traced ambient occlusions, or ray-traced global illuminations. However, different variations of the process 160 may be used for denoising different ray-tracing effects, some examples of which are described herein.

The process 160 may use the spatial filter 120 to filter noisy lighting condition data for a pixel using noisy lighting condition data for neighbor pixels. The lighting condition data may correspond to the currently rendered state of the virtual environment (e.g., of the image 114). The filtered lighting condition data may be used to generate the image 116. The process 160 is shown as also including temporal filters to filter the lighting condition data for the pixel. However, in some examples, the process 160 may include the spatial filter 120 without using any temporal filters to filter the lighting condition data. For example, the temporal filter 126 and/or the temporal filter 130 may not be employed. However, applying one or more temporal filters to the lighting condition data may increase the effective sample count of ray-traced samples used to determine the filtered lighting condition data for the pixel and/or may increase the temporal stability of the filtered lighting condition data for the pixel.

In the process 160, a spatial filter determiner may determine spatial filters—such as the spatial filter 120—based at least in part on scene data that is descriptive of the virtual environment 200, such as render data. For example, as shown in FIG. 1B, a spatial filter determiner may use visibility data 152, hit distance data 154, and/or other data corresponding to ray-traced samples as inputs to determine the spatial filter 120. Also, where temporal filters are used in the process 160, a temporal filter determiner may use motion vector data 150, and/or other data as inputs to determine a temporal filter—such as the temporal filter 126. The motion vector data 150 may also be based at least in part on the visibility data 152 and/or other data corresponding to ray-traced samples.

To determine the visibility data 152 and/or the hit distance data 154 used to determine the spatial filter 120 for a pixel for an instance of the process 160, a spatial filter determiner may use ray-traced samples of the pixel. For example, for the pixel 212 (and/or 132), the hit distance data 154, the visibility data 152, and/or other scene data for the pixel 212 may correspond to one or more of the primary and/or secondary rays used to determine the nosy lighting condition data for the pixel 212 (and/or other rays). A spatial filter determiner may determine the spatial filter 120 based at least in part on geometry of the virtual environment 200, which may be determined using the scene data. For example, a spatial filter determiner may use the hit distance data 154 to determine a size and/or shape of the spatial filter 120 (e.g., one or more dimensions such as length and/or width). Examples include the hit distance between the point 216 and the screen 204, between the point 216 and the object 226, between the point 216 and the occluder 224, and/or between the point 216 and the surface 210.

For example, for any of the various effects, the size (e.g., widths) of the spatial filter 120 for that effect may be adaptively varied based at least in part on (e.g., may be a function of) the ray hit distance (e.g., determined from the hit distance buffer used to render the image 114) of a secondary ray cast from the point 216. For example, for each point 216 the image renderer 102 may cast any number of rays for the point 216, as described herein. Based at least in part on the length of the rays, the footprint size of the spatial filter 120 may be adapted. For example, the size of the spatial filter 120 may be correlated with the length of the rays (e.g., with a longer ray(s) resulting in a larger size and a shorter ray(s) resulting in smaller sizes). For shadows, size may be based at least in part on the length of the ray 220, for reflections, the ray 218, and for ambient occlusions or global illuminations, the ray 222. A spatial filter determiner may use at least some of the rays used to sample lighting conditions for the pixel 212 to determine the filter size of a spatial filter for the pixel 212. However, in any example, a spatial filter determiner may use one or more different rays than those used to sample lighting conditions for the pixel 212 to determine the filter size of a spatial filter for the pixel 212. In any example, the size of the spatial filter for a pixel may be determined by casting one or more view vectors through the pixel. However, in some embodiments, the size may be determined based at least in part on an image space analysis of the image 114 in addition to or instead of ray hit distances and/or ray visibility.

In various embodiments, one or more spatial filters and/or temporal filters may be applied to the inputs used to determine the spatial and/or temporal filters of the process 160. Examples of these include the temporal filter 126, the spatial filter 120, and/or the temporal filter 130. For example, an image filterer may apply the spatial filter 142 and the temporal filter 144 to the hit distance data 154 of the state of the virtual environment 200. The spatial filter(s) 142 may comprise, for example, a minimum filter (to preserve contact details) followed by a box filter. A spatial filter determiner 104 may use the hit distance data 154 to determine a size and/or shape of the spatial filter 120 (e.g., one or more dimensions such as length and/or width). The filtering may enhance the spatial and temporal stability of the sizes and/or shapes of the spatial filter 120. Further, the image filterer 108 may apply the temporal filter 140 to the visibility data 152 of the state of the virtual environment 200. For example, the spatial filter determiner 104 may only determine and apply the spatial filter 120 for a rendering effect(s) when a point and/or pixel has visibility according to at least one corresponding primary and/or secondary ray (e.g., the ray 214 and the ray 220 for ray-traced shadows), which may be captured by the visibility data 152. The filtering may enhance the temporal stability of the generation of the spatial filter 120 as well as of motion vectors derived from the visibility data 152.

The spatial filter 120—and/or other filters described herein—may have a filter kernel. The filters may also have one or more filter directions. The filter kernel of a filter may refer to a matrix (e.g., rectangular array) that defines one or more convolutions for processing image data for an image (e.g., data values of pixels) to alter one or more characteristics of the image, such as shades and colors of the pixels for the image. In some examples, a filter kernel may be applied as a separable filter, examples of which are also described with respect to FIG. 4. In applying a filter as a separable filter, the matrix may be represented using multiple sub-matrices, or filters, that may be separately applied to image data in multiple passes. When determining or computing a filter kernel for a separable filter, the disclosure contemplates that the sub-matrices may be directly computed, or may be derived from another matrix.

Each element of a matrix of a filter kernel may correspond to a respective pixel position. One of the pixel positions of a matrix may represent an initial pixel position that corresponds to a pixel to which the filter is applied and may be located at the center of the matrix (e.g., used to determine the location of the filter). For example, when applying the spatial filter 120 to the pixel 132 of the image 114, the pixel 132 may have the initial pixel position. In applying some filters, such as the spatial filter 120, data values for other pixels may be used at image locations that are determined relative to the pixel 132 to determine a data value(s) for the pixels within the footprint of the filter kernel. A filter direction may define the alignment of the matrix relative to the image and/or pixel to which the filter is applied along a filter width. Thus, when applying a filter—such as the spatial filter 120—to a pixel, other pixels for other pixel positions of a matrix of a filter kernel may be determined relative to the initial pixel position using the filter direction(s) and the filter kernel.

Each element of a matrix of a filter kernel may comprise a filter weight for the pixel position. The matrix may be applied to an image using convolution, in which a data value for each pixel of the image that corresponds to a pixel position of the matrix may be added or otherwise combined with data values for pixels that correspond to the local neighbors in the matrix, as weighted by the filter values (also referred to as filter weights). For one or more of the filters described herein—such as the spatial filter 120—the filter values may be configured to blur the pixels, such as by fitting a distribution(s) to the filter kernel (e.g., to a width and a height). FIGS. 5A and 5B are used herein to describe some examples of fitting a distribution function(s) to a filter kernel, such as of the spatial filter 120.

The data values to which the temporal filter 126, the spatial filter 120, and the temporal filter 130 are applied may correspond to lighting condition data for the pixels. Thus, applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray-tracing.

Conventional approaches for denoising ray-tracing effects compute an isotropic filter kernel which is always circularly symmetric, and often does not correspond to the direction of light relative to a point in a virtual environment. Using such an isotropic filter kernel for a filter may result in unrealistic blurring where either too few or too many pixels are blurred by the filter, and where the filter values of the filter do not result in lighting condition data being shared amongst pixels in a realistic manner. In various examples, the present disclosure may provide for computing an anisotropic filter kernel that may be elongated so that a size of the filter kernel extends farther along a first axis than along a second axis to more closely reflect the directional nature of the light in the virtual environment relative to the point. Where a spatial filter is an anisotropic filter, the footprint of the spatial filter may be elliptical, rather than circular. For example, the footprint may have multiple different filter widths and corresponding filter directions (e.g., a filter direction 136 and a filter direction 138 of the spatial filter 120) that define the size and orientation of the spatial filter to more accurately reflect the directional nature of light in the virtual environment.

Sparse Sampling of Spatial Filters

Figure 3A:
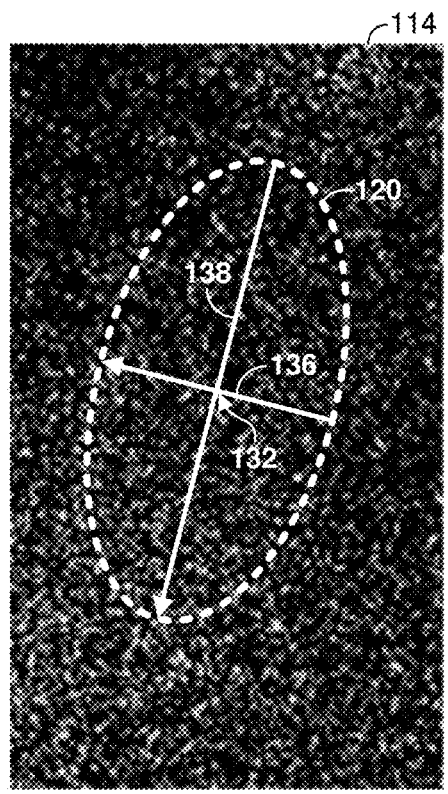
FIG. 3A is a diagram illustrating an example of a spatial filter, which may be used to denoise lighting condition data for a frame, in accordance with some embodiments of the present disclosure.

FIG. 3A is a diagram illustrating the spatial filter 120 for the pixel 132, in accordance with some embodiment of the present disclosure. The application of filters, such as the spatial filter 120, by the image filterer 108 on render data used to render the image 116 introduces computational overhead, which may increase the render time of the image 116. If the computational overhead is too great, the render time may be too long for real-time rendering applications, such as gaming, or other rendering applications. For example, in applying the spatial filter 120 to the pixel 132, one approach is for the image filterer 108 to apply filtering for each pixel in the image 116 that is within the footprint of the spatial filter 120, as shown in FIG. 3A (unless the render data for the pixel is discarded). This may involve convolving the render data for the pixels with the filter kernel of the spatial filter 120 in which a weighted sum may be computed around each pixel. In some examples, the footprint of the spatial filter 120 may be as large as 500 pixels by 100 pixels. Further, as described herein a spatial filter 120 may be applied for each ray-tracing effect and pixel in the image 116. Each of these factors may contribute to the computational overhead in filtering render data to render the image 116.

To reduce the computational overhead in applying the spatial filter 120, the filter kernel may be applied as a separable filter in which the image filterer 108 applies the filter kernel in multiple passes. Each pass may be in a respective filter direction and may be applied using a sub-filter kernel, or sub-matrix that corresponds to the filter kernel along the filter direction. For example, the image filterer 108 may apply the spatial filter 120 along the filter direction 136 in one or more passes and along the filter direction 138 in one or more passes, as further described with respect to FIG. 4.

In some examples, the filter direction 136 and 138 of the spatial filter 120 for different pixels and/or rendering effects may be different to more accurately capture the geometric properties of the virtual environment 200. This may limit some computational optimizations, such as using the same horizontal passes and vertical passes to concurrently apply each spatial filter 120. In these embodiments, it may be desirable to further reduce the computational overhead when applying one or more of the filters of the process 160—such as the spatial filter 120—using the image filterer 108. In accordance with some aspects of the present disclosure, when applying a filter to render data, the image filterer 108 may sparsely sample the filter. Approaches in which a filter is sparsely sampled may be used in combination with applying the filter as a non-separable filter, or a separable filter, such as in the examples of FIG. 3B-3D.

Figure 3B:
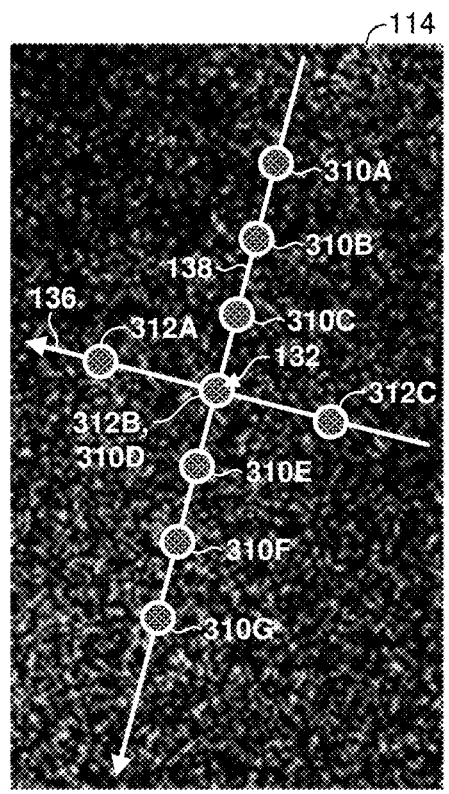
FIG. 3B is a diagram illustrating an example of locations of filter taps used to sparsely sample the spatial filter of FIG. 3A, in accordance with some embodiments of the present disclosure.
Figure 3C:
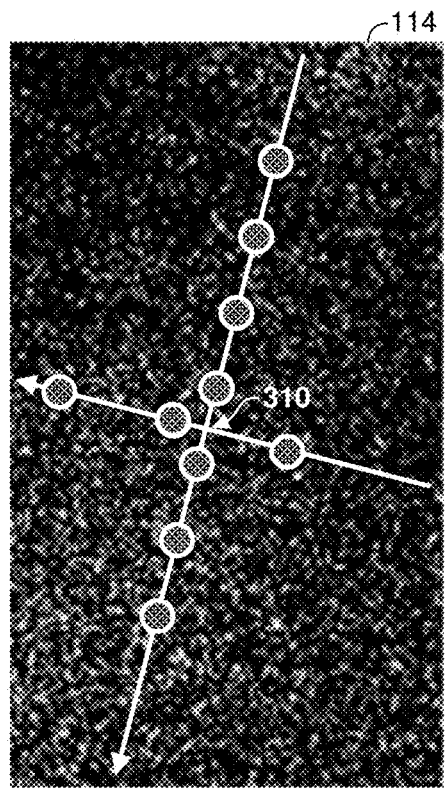
FIG. 3C is a diagram illustrating an example of locations of filter taps used to sparsely sample another spatial filter to denoise lighting condition data for the frame of FIG. 3A, in accordance with some embodiments of the present disclosure.
Figure 3D:
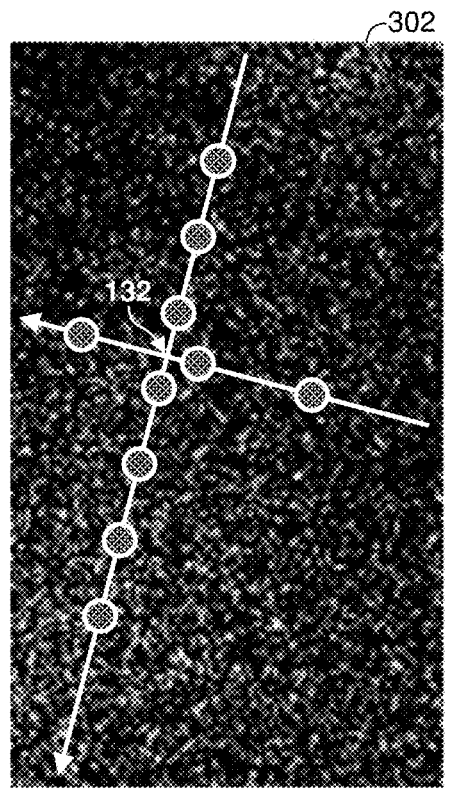
FIG. 3D is a diagram illustrating an example of locations of filter taps used to sparsely sample a spatial filter used to denoise lighting condition data for a different frame than FIGS. 3A, 3B, and 3C, in accordance with some embodiments of the present disclosure.

Referring now to FIGS. 3B-3D, FIGS. 3B-3D are diagrams illustrating sparse sampling and jittering of spatial filters, in accordance with some embodiments of the present disclosure. In some examples, rather than fully sampling the spatial filter 120, the image filterer 108 may sparsely sample the spatial filter 120. For example, rather than filtering for each pixel in the footprint of the spatial filter 120, the historical values may be sparsely sampled at (e.g., only at) locations of filter taps that are dispersed within the spatial filter 120. Referring now to FIG. 3B, FIG. 3B illustrates sparse sampling of the spatial filter 120 using filter taps, in accordance with some embodiments of the present disclosure. For example, in separably applying the spatial filter 120 in the filter direction 136, the image filterer 108 may use taps 312A, 312B, and 312C. Also, in applying the spatial filter 120 in the filter direction 138, the image filterer 108 may use taps 310A, 310B, 310C, 310D, 310E, 310F, and 310G. In the example where the spatial filter is 500×100, without sparse sampling, the image filterer 108 may in one direction tap each pixel 500 times and for another tap each pixel 100 times. When the spatial filter 102 is a separated filter, a tap may comprise a weighted sum along a particular filter direction. Using sparse sampling, only 10-20 taps may be taken per filter direction for each frame (e.g., equidistantly spaced). In some examples, the same number of taps may be taken each frame and if there are fewer pixels than that threshold number, the pixels may be fully sampled.

The image filterer 108 may use various factors to determine the number of filter taps and/or the locations of filter taps. Factors that may impact one or more of the number of the filter taps and/or the locations of the filter taps determined by the image filterer 108 may include one or more of a size of the footprint of the spatial filter 120, one or more dimensions of the footprint (e.g., along a particular filter direction), a budget on the number of filter taps (e.g., a total for all dimensions collectively or along a particular filter direction), the number of temporal samples used by the temporal filter 126 and/or the temporal filter 130, and/or the variance in render data for the pixels in the footprint of the spatial filter 120.

With respect to the budget(s) on the number of filter taps, a budget may be different for each filter direction, and/or may be a collective total budget (or the budget for each direction may be allocated from a shared budget). For example, based at least in part on the spatial filter 120 being shorter along the filter direction 136 than the filter direction 138, the image filterer 108 may assign a lower budget to the filter direction 136 (e.g., a fraction of the filter taps, such as 10 filter taps vs. 20 filter taps). In embodiments where the number of filter taps is dynamically determined by the image filterer 108 (e.g., based on the size of the footprint of the spatial filter 120 and/or other factors), the budget on filter taps may serve as a cap on the number of filter taps. In other examples, the number of filter taps may be set to the budget, although the distribution of the filter taps may vary based on the size of the footprint of the spatial filter 120 and/or other factors.

With respect to the size and/or dimensions of the footprint, the number of filter taps along the filter direction 136 may be based at least in part on the size of the footprint along the filter direction 136 and the number of filter taps along the filter direction 138 may be based at least in part on the size of the footprint along the filter direction 138. For example, the number of filter taps along a filter direction may increase with the length of a dimension. With respect to the number of temporal samples used by the temporal filter 126 and/or the temporal filter 130, the number of filter taps may increase with the number of temporal samples used in a temporal filter. With respect to the variance in render data for the pixels in the footprint of the spatial filter 120, the number of filter taps may increase with the variance in the render data for the current and/or previous frame.

In some examples, the image filterer 108 determines the locations of the filter taps such that they are each equally spaced from one another. However, in other examples, the spacing between particular filter taps may be spaced differently relative to one another, or the locations and/or spacing may otherwise be dynamically determined according to any combination of the above factors, or other factors.

Jittering of Spatial Filters

While sparsely sampling spatial filters may reduce the computational cost of applying the filters, it may also result in noise in the render data between locations of filter taps. To reduce or eliminate the noise, the locations of filter taps for spatial filters may be jittered spatially and/or temporally. This may be accomplished by the image filterer 108 determining the locations of one or more of the filter taps for one or more of the spatial filters randomly or pseudo-randomly (and/or using some other algorithmic approach). For example, the image filterer 108 may determine one or more locations for one or more of the filter taps stochastically. As an example, given a number of filter taps along the filter direction 136 that are to be equally spaced, the image filterer 108 may stochastically select a location for filter taps (e.g., within a range of locations from the center pixel that is within the spacing distance). A similar approach may be used for the filter direction 138. As further examples, a similar approach may be used to stochastically select filter tap locations individually.

In various examples, to determine the location(s) for a filter tap(s), the image filterer 108 may use a location selection parameter(s) that selects the location(s) within the spatial filter 120. For example, a location selection parameter may be an offset value(s) for each of the filter taps along a filter direction relative to a location of the spatial filter 120. To jitter the locations of filter taps between spatial filters, the image filterer 108 may vary one or more of the location selection parameters for different spatial filters. In the example where the filter taps are equally spaced, the offset value may be used to set the location of each of the filter taps. By using a different offset value, each of the filter taps may be at a different location. While the location selection parameter(s) may be randomly or pseudo-randomly selected by the image filterer 108 (e.g., using one or more random seeds to determine a location selection parameter(s)) in some examples, the location selection parameter(s) may be adjusted using different approaches, such as based at least in part on a spatial and/or temporal analysis of render data and/or image data for the scene, suing rotating locations configurations, etc.

Referring now to FIG. 3C, FIG. 3C is used to illustrate an example of spatially jittering filter taps of spatial filters, in accordance with some embodiments of the present disclosure. FIG. 3C may correspond to filter taps of the spatial filter 120 for a pixel 310 of the image 116 that is different than the pixel 132 and/or for a different render effect. As indicated in FIG. 3C, at least one or more of the relative locations of the filter taps within the spatial filter 120 may be different than in FIG. 3B (e.g., via stochastically sampling the locations of the filter taps). This may result in the spatial filter for different pixels and/or rendering effects collectively leveraging render data for more pixels, thereby reducing noise.

Referring now to FIG. 3D, FIG. 3D is used to illustrate an example of temporally jittering filter taps of spatial filters, in accordance with some embodiments of the present disclosure. FIG. 3D may correspond to filter taps of the spatial filter 120 for the pixel 132 in an image 302 that may be rendered using the process 160. The image 302 may correspond to a state of the virtual environment 200 that is subsequent to the state of the virtual environment 200 of the image 116 (e.g., the subsequent frame). As indicated in FIG. 3D, at least one or more of the relative locations of the filter taps within the spatial filter 120 may be different than in FIG. 3D (e.g., via stochastically sampling the locations of the filter taps). This may result in the spatial filter for different frames collectively leveraging render data for more pixels, thereby reducing noise. For example, the temporal filter 130 may accumulate samples of the lighting condition data that is filtered by the spatial filter 120 over multiple iterations of the process 160, such that lighting condition data that corresponds to the image 302 may be based at least in part on the application of the spatial filter 120 in FIG. 3B to the pixel 132 and the application of the spatial filter 120 in FIG. 3D to the pixel 132.

Temporal Filtering of Render Data

The temporal filter 126 may be a temporal reprojection filter used by the image renderer 102 to increase the effective sample count of ray-traced samples used to generate the lighting condition data for the pixel for the state of the virtual environment. In determining the temporal filter 126, the temporal filter determiner 106 may use motion vectors captured by the motion vector data 150 for temporal reprojection. The temporal filter 126 may be used to filter lighting condition data for the pixel using ray-traced samples of neighbor pixels that corresponds to one or more previously rendered states of the virtual environment 200. The temporal filter 130 may be used to enhance the temporal stability of the spatial filter 120.

To determine a temporal filter, the temporal filter determiner 106 may accumulate samples of temporal render data for pixels that correspond to any number of previous states of the virtual environment. For example, to determine the temporal filter 126 the temporal filter determiner 106 may accumulate samples of ray-traced lighting condition data for pixels from any number of previous states. To determine the temporal filter 130, the temporal filter determiner 106 may accumulate samples of filtered lighting condition data for pixels from the spatial filter 120 for pixels from any number of previous states.

The temporal filter determiner 106 may store the accumulated samples for a temporal filter in a temporal sample buffer, which may be updated for each rendered state using an update 162. For example, in an iteration of the process 160, the temporal filter determiner 106 may use samples for the current state being rendered to update the temporal sample buffer in the update 162. In a subsequent iteration of the process 160, the updated temporal sample buffer may then be used to determine and apply the temporal filter to render the subsequent state.

In determining a temporal filter, the number of accumulated samples may, for example, be capped at a sample cap number (e.g., anywhere from eight samples to sixteen samples). As an example, for each pixel, the temporal filter 126 may accumulate as many as eight ray-traced samples from eight previous frames, increasing the potential effective sample count by a factor of eight. Thus, where each rendered frame corresponds to a single sample per pixel, the temporal filter 126 may increase the effective sample count to as many as eight samples per pixel. The various temporal filters of FIG. 1B (e.g., the temporal filter 126 or the temporal filter 130) may use the same or different sample cap number. Further, the sample cap number(s) may remain constant or may change over time, such as based on states of the virtual environment 200.

In various examples, the temporal sample buffer may comprise a rolling window of samples (e.g., of up to the sample cap number of samples) that may be updated for each rendered frame. The image filterer 108 may apply a temporal filter to a pixel similar to a spatial filter. However, the data value of a pixel used in convolving the filter kernel may instead be an aggregation of a data value of the pixel for the current state of the virtual environment 200 and data values for one or more previous states (e.g., frames) of the virtual environment 200. In determining an aggregate data value for a pixel, the temporal filter determiner 106 may weigh each of the data values. For example, each data value may be weighted equally or different data values may be assigned different weights. In some examples, a historical data value for each pixel is accumulated in the temporal sample buffer, and the image filterer 108 combines the historical data value with the current data value for the pixel to determine the aggregate data value for the pixel.

The temporal filters applied by the image filterer 108, such as the temporal filters 126, 130, 140, and/or 144 may, for example, be exponential filters, such as Exponentially Weighted Moving Average (EWMA) filters. To apply an exponential filter, the image filterer 108 may use an exponential average pass in screen space, with per-pixel varying exponential weights calculated from the accumulated per-pixel temporal sample count.

Lighting condition data for a pixel may change rapidly, such as due to changes in the lighting conditions of the virtual environment 200. This may reduce the relevancy of the historical data values for a pixel. As a result, using the historical data values may cause visual artifacts in the image 116, such as lagging or ghosting. In accordance with some aspects of the present disclosure, lagging or ghosting may be reduced or eliminated by clamping the filtered data value for a pixel to the current frame being rendered. For example, to clamp a filtered data value produced by a temporal filter, the image filterer 108 may determine a range of data values for the pixel that defines a maximum and minimum value for the filtered data value. The image filterer 108 may use the maximum or minimum data value to clamp the filtered data value produced by the temporal filter to the range.

To compute the range of data values for a pixel, the image filterer 108 may use statistical information of data values (e.g., color values) of neighbors to the pixel for the current frame. For example, for a pixel, the image filterer 108 may determine the mean $\mu$ and standard deviation $\gamma$ in the data values for a window of pixels around the pixel. The minimum of the range of data values may correspond to $[\mu-\gamma]$ and the maximum of the range of data values may correspond to $[\mu+\gamma]$. In some examples, the window may have less than one-hundredth of the resolution of the frame, such as 3×3, 5×5, 7×7, 10×10, etc., for a 1080p resolution. To conserve processing power, the mean $\mu$ and standard deviation $\gamma$ may be estimated, such as by sparse sampling and tapping the window. This may be particularly useful for larger windows, such as where the window has greater than one-fiftieth of the resolution of the frame, such as 30×30, 40×40, 50×50, etc., for a 1080p resolution.

The clamping of data values for temporal filtering may be used with at least one of the temporal filters of FIG. 1B. Where the temporal filter 126 and the temporal filter 130 are used in the process 160, and both are applied with the clamping of data values, the temporal filter 130 may have a smaller clamping radius, or window, than the temporal filter 126 as the lighting condition data has less noise when the temporal filter 126 is applied.

Adapting the Filter

In various examples, the spatial filter determiner 104 may determine the size of the spatial filter 120 and/or one or more geometries thereof based at least in part on an amount of rays (e.g., ray-traced samples) used to determine lighting conditions for the pixel 132 and/or the pixel 212. For example, the present disclosure may provide for accurate reflections using a single ray-traced sample of a state of the virtual environment 200 that includes the ray 214 and the ray 218. Where more than one ray-traced sample is used, the spatial filter determiner 104 may compute the size and/or one or more geometries of the spatial filter 120, such that the size and/or one or more geometries decrease based on (e.g., proportionally with) the number of samples (and/or reflected rays and/or eye rays). A suitable adjustment factor for the size and/or one or more geometries may be computed by the spatial filter determiner 104 as $1/\sqrt{n}$, where n is the number of ray-traced samples.

In some examples, the image renderer 102 uses at least one ray-traced sample of at least one previous state of the virtual environment 200 (e.g., each state may correspond to a rendered frame representative of the virtual environment 200) to determine lighting conditions for the pixel 132 and/or the pixel 212 at a subsequent state of the virtual environment 200. For example, any number of temporal ray-traced samples may be used to determine lighting conditions for the pixel 132 and/or the pixel 212 in addition to the one or more spatial or current ray-traced samples used to determine the lighting conditions for the pixel 132 and/or the pixel 212 (e.g., using a temporal filter that may use the geometry of the spatial filter 120). Where a number of temporal ray-traced samples are used, those samples may be counted toward the number of ray-traced samples, n, or may otherwise be used to reduce the size and/or one or more geometries of the spatial filter 120.

Adapting Spatial Filter Size Based at Least in Part on Sample Count

In various examples, the spatial filter determiner 104 may determine a size of the spatial filter 120 and/or one or more dimensions (e.g., the width of the footprint along the filter direction 136 or the width of the footprint along the filter direction 138) thereof based at least in part on an amount of rays (e.g., ray-traced samples) used to determine lighting conditions of the for the pixel 132 and/or the pixel 212. For example, the present disclosure may provide for accurate renders with ray-tracing effects that use a single ray-traced sample of a state of the virtual environment 200 that includes the ray 214 and a single secondary ray for each interaction with the virtual environment 200. Where more than one ray-traced sample is used, the spatial filter determiner 104 may compute the size and/or one or more geometries of the spatial filter 120, such that the size and/or one or more geometries decrease based at least in part on (e.g., proportionally with) the number of samples (and/or reflected rays and/or eye rays). A suitable adjustment factor for the size and/or one or more geometries may be computed by the spatial filter determiner 104 according to equation (1), below:

$$1/\sqrt{n} \qquad (1)$$

where n is the number of ray-traced samples.

In some examples, the image renderer 102 uses at least one ray-traced sample of at least one previous state of the virtual environment 200 (e.g., each state may correspond to a rendered frame representative of the virtual environment 200) to determine lighting conditions for the pixel 132 and/or the pixel 212 at a subsequent state of the virtual environment 200. For example, as described herein, using the temporal filter 126, any number of accumulated temporal ray-traced samples may be used to filter lighting condition data for the pixel 132 and/or the pixel 212 in addition to the one or more spatial or current ray-traced samples used to determine the lighting conditions for the pixel 132 and/or the pixel 212. The number of accumulated temporal ray-traced samples used to filter lighting condition data for a pixel may also be referred to as the temporal sample count or a count of the historical data values of the temporal filter(s), and may be captured by temporal sample count data 156 in FIG. 1B. For example, the count may be set to or computed as the number of frames from which the historical pixel values of the temporal filter(s) 126 are generated and/or a per pixel sum, average, and/or other value computed based at least in part on the number of frames from which the historical pixel values are generated for each pixel (e.g., at least some historical pixel values may not be used for at least some pixels in some examples and/or may not be included in the count or may be given a lower weight in the count due to clamping). The temporal sample count may be included toward the number of ray-traced samples n of Equation (2) in addition to or instead of the number of spatial samples for the pixel, or may otherwise be used to reduce and adapt the size and/or one or more dimensions of the spatial filter 120. Using Equation (2), or another suitable equation, the size of a spatial filter may be inversely correlated with the count of historical pixel values.

Examples of Separable Filtering

Figure 4:
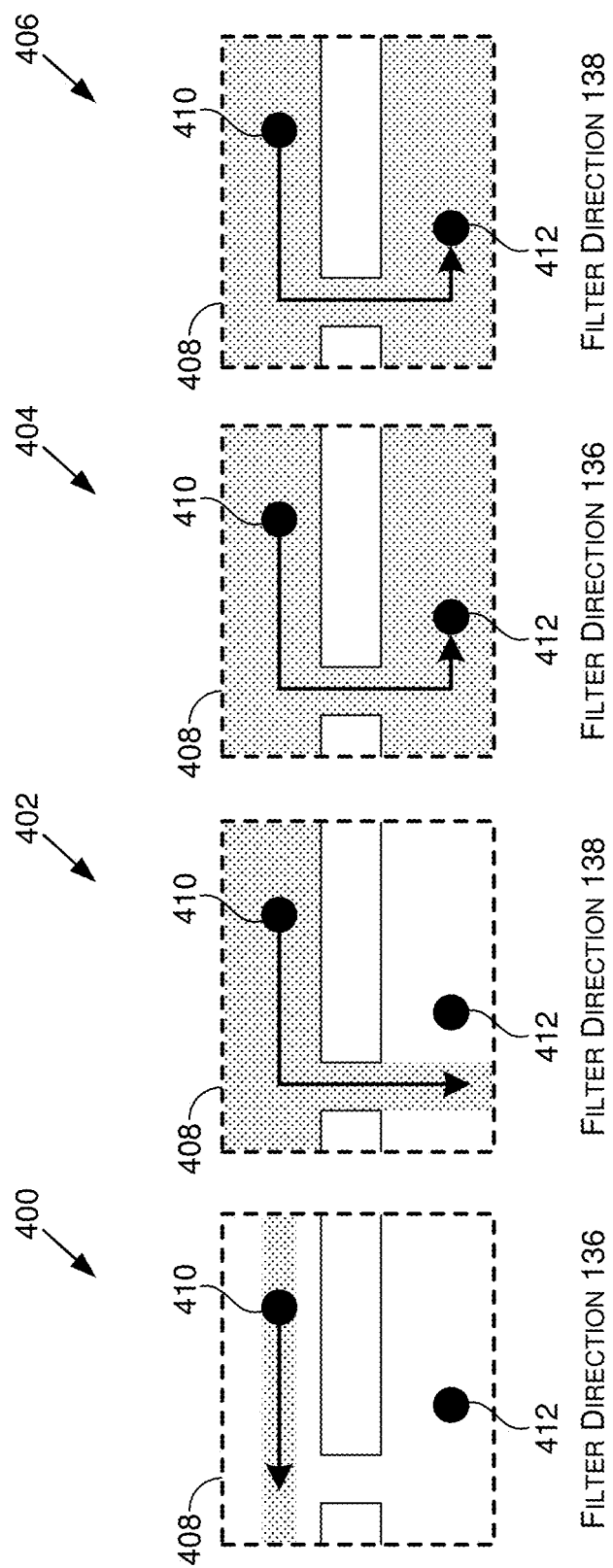
FIG. 4 is a diagram illustrating an example of applying a filter kernel as a separable filter using multiple iterations per filter direction, in accordance with some embodiments of the present disclosure.

As described herein, in some examples, the image filterer 108 may apply a filter kernel as a separable filter. Referring now to FIG. 4, FIG. 4 illustrates an example of iteratively applying a filter kernel as a separable filter, in accordance with some embodiments of the present disclosure. FIG. 4 shows applying a separable filter—such as the spatial filter 120—over multiple iterations for each filter direction. For example, the application of the spatial filter 120 may include an iteration 400 and an iteration 404 for the filter direction 136 and an iteration 402 and an iteration 406 for the filter direction 138. Each of the iterations are shown for an image region 408, which may correspond to a pixel region of the image 114 and/or the image 116. As shown in the image region 408 includes a pixel 410 and a pixel 412.

In applying a filter as a separable filter, the filter kernel may be represented using multiple sub-matrices, or filters, that may be separately applied to image data in multiple passes to reduce the computational costs of applying the filter. For example, rather than applying a two-dimensional matrix to a pixel in a filter pass, a filter may be typically applied using two matrices in two independent one-dimensional passes, where the product of the two matrices is equivalent to the two-dimensional matrix. This approach may produce equivalent results to applying the two-dimensional matrix in a single pass where the filter is a true Gaussian filter. However, in some embodiments, the spatial filter 120, and/or other filters used herein, may not be a true Gaussian filter. For example, for ray-traced reflections, an NDF weight may be used as filter weights for pixels, or may be used to derive filter weights for the pixels of the spatial filter 120 to account for the mismatch in the BRDF between points in the virtual environment 200. In further examples, even where a Gaussian distribution is used to determine the filter weights for the spatial filter 120, one or more other factors may be used by the spatial filter determiner 104 to set or modify the filter weights for one or more of the pixel positions. As an example, where the normal for a pixel at a pixel position is significantly different from the pixel at the initial pixel position (indicating they may face different directions), the filter weight value for that pixel position may be reduced and/or set to zero. Thus, even where a Gaussian distribution is fit to a filter to determine filter weights, the filter may not be a true Gaussian filter.

Applying the spatial filter 120 using two matrices in two independent one-dimensional passes may be similar to the image filterer 108 only using the iteration 400 and the iteration 402, and therefore is used to illustrate potential shortcomings of this approach. For example, in one pass the image filterer 108 may use the iteration 400 of FIG. 4 to apply the spatial filter 120 along the filter direction 136 (e.g., horizontal), although with a different sub-matrix and full filter radius. In this case, pixel data for the pixel 410 may be shared with pixels in the filter direction 136. In another pass the image filterer 108 may use the iteration 402 of FIG. 4 to apply the spatial filter 120 along the filter direction 138 (e.g., vertical), although with a different sub-matrix and full filter radius. In this case, pixel data for the pixel 410 may be shared with pixels in the filter direction 138. However, as can be seen for the iteration 402, using this approach pixel information for some pixels may no longer be shared with certain other pixels when applying the filter, which may introduce visual artifacts to the image 116. For example, pixel information of the pixel 410 may not be shared with the pixel 412 (and other pixels) even where the 412 is within the footprint of the filter.

In accordance with some aspects of the present disclosure, the image filterer 108 may apply a filter—such as the spatial filter 120—using multiple iterations for each filter direction (e.g. horizontal and vertical). Using this approach, pixels may share pixel information with additional pixels, thereby reducing or eliminating visual artifacts. For example, the image filterer 108 may use the iteration 404 in addition to the iteration 400 to apply the spatial filter 120 in the filter direction 136, allowing for pixel information for the pixel 410 to be shared with the pixel 412, as shown. Additionally, the image filterer 108 may use the iteration 406 in addition to the iteration 402 to apply the spatial filter 120 in the filter direction 138, allowing for pixels to share pixel information with additional pixels.

While FIG. 4 shows two iterations for each filter direction, the disclosure contemplates any number of passes, or iterations, for each filter direction. Generally, for a given filter direction, the filter radii used for each iteration may be such that the passes are collectively equivalent to a pass using the total filter radius of the filter for that filter direction. Further, the filter radius may smaller in each subsequent pass. In some non-limiting examples, the spatial filter determiner 104 may use equation (2) to compute the filter radius, or width, $\sigma_{H_i}$ for each pass, i, for a filter direction follows:

$$\sigma_{H_i} = \sigma_H \sqrt{3} \, \frac{2^{N-i}}{\sqrt{4^N - 1}} \quad (2)$$

where N is the total number of iterations and $\sigma_H$ is the total filter radius, or width, of the filter direction.

Additional Examples of Denoising Lighting Condition Data

In some embodiments, the process 160 may not use one or more of the temporal filters 126, 130, 140, or 144, of FIG. 1B, to filter lighting condition data, or may use different or additional temporal filters. Also, the process 160 may not use one or more of the spatial filters 120 or 142 of FIG. 1B, to filter lighting condition data, or may use different or additional spatial filters. Further, the process 160 for different ray-tracing effects may use different or additional temporal and/or spatial filters to filter the lighting condition data. Further, one or more hyper parameters of the temporal and/or spatial filters may be different for different ray-traced rendering effects and/or filters, such as a budget on filter taps, a stride for filter convolutions, a sample cap number for temporal filters, a window of pixels around the pixel used to clamp pixel values using a temporal filter, the one or more dimensions of a filter, and/or a number of iterations used for separable filtering.

In any example, one or more additional spatial filters may be used to filter the lighting condition data of the image 114 prior to a temporal filter (e.g., the temporal filter(s) 126). The additional spatial filter(s) may comprise a strided spatial filter. The strided spatial filter may act to increase the local variance of the lighting condition data. This approach may allow the subsequent temporal filter(s) to reuse more historical pixel data. An example of a suitable strided spatial filter is a strided box filter. The strided spatial filter may, as a non-limiting example, use anywhere from five to ten taps per pixel. Using the strided spatial filter may be useful for ray-traced global illuminations, but may be used for any of the various ray-traced rendering effects described herein.

Additional Examples of Determining Filter Weights for Filter

Various approaches may be used to determine filter weights for the filters described herein. As mentioned, as one example, the spatial filter determiner 104 may use NDF values to determine the filter weights for the spatial filter 120 for ray-traced reflections. For any filter described herein, the filter weights for the spatial filter 120 may be determined based at least in part on fitting a distribution function(s) to a width(s) of the spatial filter 120, as described with respect to FIG. 3A and FIG. 3B, or one or more other approaches may be used.

Referring now to FIG. 5A, FIG. 5A is a diagram illustrating an example of a graph 500A of filter weight values that may be determined by fitting a distribution function to the width of the spatial filter 120 along the filter direction 136, which may be used to determine filter weights for the spatial filter 120, in accordance with some embodiments of the present disclosure.

The spatial filter determiner 104 may compute filter weights for the spatial filter 120 based at least in part on fitting a distribution function to the width of the spatial filter 120 along the filter direction 136, as indicated in FIG. 5A. The width may span a pixel position 514 and a pixel position 516, with the pixel position 512 there between. The pixel position 512 may, for example, correspond to a midpoint or center of the filter kernel, and may be an initial pixel position to which the spatial filter 120 is applied. For example, where the image filterer 108 applies the spatial filter 120 to the pixel 212, the pixel 212 may correspond to the initial pixel position.

By fitting the distribution function to the width, the spatial filter determiner 104 may compute the filter values of the spatial filter 120 such that the filter values across the pixel positions of the width 510 substantially correspond to the distribution function or are otherwise based at least in part on the distribution function. For example, the distribution function of FIG. 5A may be a Gaussian distribution function in which the spatial filter determiner 104 sets or maps the mean or center of the Gaussian distribution function to the pixel position 512. Thus, the pixel position 512 may be associated with a highest filter value.

The spatial filter determiner 104 may also set or map one or more other points along the distribution function to one or more other pixel positions. For example, the spatial filter determiner 104 may set or map a first position from the mean or center of the distribution function that corresponds to one or more standard deviations (or other distance) from the mean or center to the pixel position 514. Similarly, the spatial filter determiner 104 may set or map a second position from the mean or center of the distribution function that corresponds to one or more standard deviations (or other distance) from the mean or center to the pixel position 516. In the example shown, the pixel position 514 and the pixel position 516 may each be associated with a lowest filter value along the width due to using a Gaussian distribution function. The positions of the pixel position 514 and the pixel position 516 with respect to the distribution function are shown as examples in FIG. 5A, and may vary. For example, the pixel position 514 and the pixel position 516 may be associated with different filter values with respect to one another. Further, as mentioned herein, one or more of the filter values may adjusted, discarded, or otherwise determined such that the spatial filter 120 is not a true Gaussian filter.

Referring now to FIG. 5B, FIG. 5B is a diagram illustrating an example of a graph 500B of filter weight values that may be determined by fitting a distribution function to the width 520 of the spatial filter 120 along the filter direction 158, which may be used to determine filter weights for the spatial filter 120, in accordance with some embodiments of the present disclosure. The graph 500A may be depicted at the same scale as the graph 500B

The spatial filter determiner 104 may compute filter weights for the spatial filter 120 based at least in part on fitting a distribution function to the width 520 of the spatial filter 120 along the filter direction 158, as indicated in FIG. 5B. The width 520 may span a pixel position 524 and a pixel position 526, with the pixel position 512 there between.

By fitting the distribution function to the width 520, the spatial filter determiner 104 may compute the filter values of the spatial filter 120 such that the filter values across the pixel positions of the width 520 substantially correspond to the distribution function or are otherwise based at least in part on the distribution function. For example, the distribution function of FIG. 5B may be a Gaussian distribution function, similar to FIG. 5A, in which the spatial filter determiner 104 sets or maps the mean or center of the Gaussian distribution function to the pixel position 512. In other examples, different distribution functions may be fit to different filter directions for determining filter weights of the spatial filter 120. The distribution function(s) may capture the relative contribution of lighting conditions of adjacent pixels to the pixel at the initial pixel position (e.g., the pixel 212), such that lighting information may be appropriately shared with the pixels. For example, the farther the pixel from the initial pixel position, the less likely it is to contribute to the lighting conditions of the pixel at the initial pixel position.

The spatial filter determiner 104 may also set or map one or more other points along the distribution function to one or more other pixel positions. For example, the spatial filter determiner 104 may set or map a first position from the mean or center of the distribution function that corresponds to one or more standard deviations (or other distance) from the mean or center to the pixel position 514. Similarly, the spatial filter determiner 104 may set or map a second position from the mean or center of the distribution function that corresponds to one or more standard deviations (or other distance) from the mean or center to the pixel position 516. In the example shown, the pixel position 524 and the pixel position 526 may each be associated with a lowest filter value along the width 520 due to using a Gaussian distribution function. The positions of the pixel position 524 and the pixel position 526 with respect to the distribution function are shown as examples in FIG. 5B, and may vary. For example, the pixel position 524 and the pixel position 526 may be associated with different filter values with respect to one another.

In the examples of FIGS. 5A and 5B, the distribution of filter weight values along the width 520 may be more spread out than along the width 510 based at least in part on the width 520 being greater than the width 510 (e.g., because the Gaussian distribution function is mapped in a similar way to each width). Further, as mentioned herein while a distribution(s) may be used to determine the filter weights, one or more of the filter weights may not follow the distribution. For example, where the normal for a pixel at a pixel position is significantly different from the pixel at the initial pixel position (indicating they may face different directions), the filter weight value for that pixel position may be reduced and/or set to zero. The graphs 500A and 500B may correspond to cross-bilateral components of the spatial filter 120.

Figure 6:
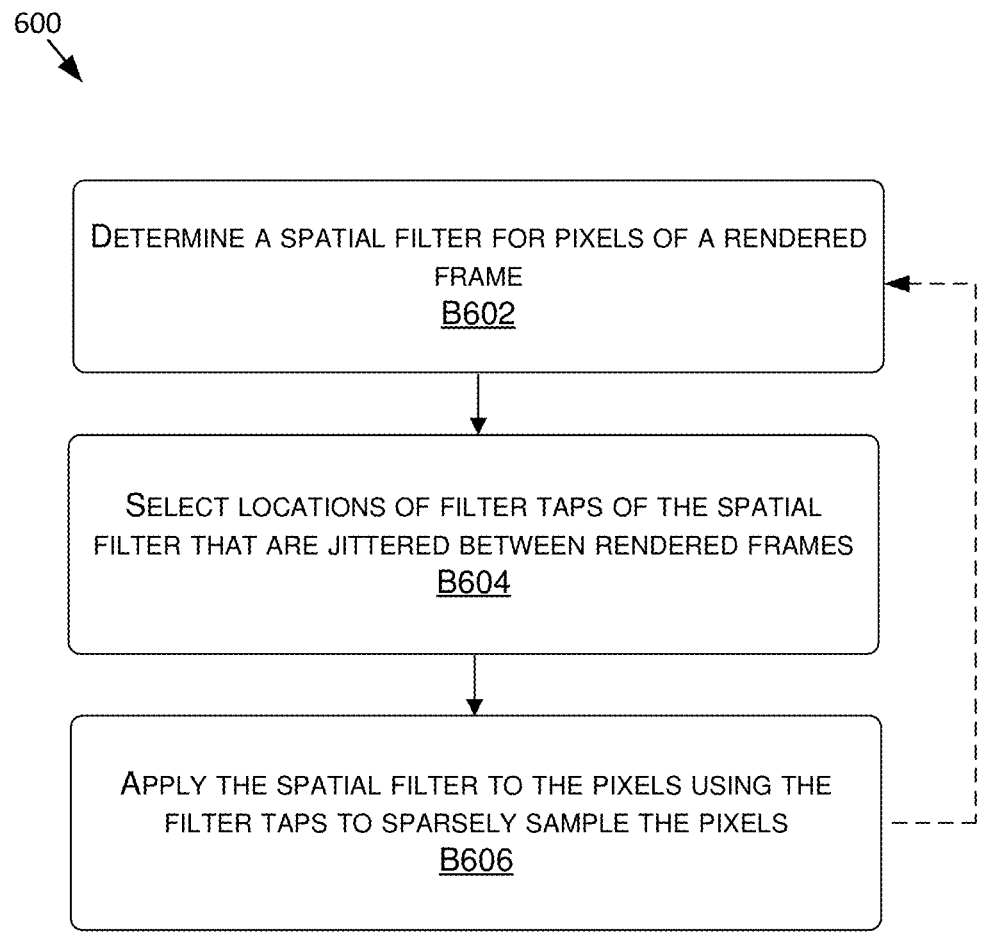
FIG. 6 is a flow diagram showing a method for denoising rendered frames that includes sparsely sampling pixels using temporally jittered locations of filter taps, in accordance with some embodiments of the present disclosure.

Now referring to FIG. 6, each block of a method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the temporal-spatial denoising system 100 (FIG. 1A). However, these methods may additionally or alternatively be executed by any one system, or any combination of systems, including, but not limited to, those described herein.

FIG. 6 is a flow diagram showing a method 600 for denoising rendered frames that includes sparsely sampling pixels using temporally jittered locations of filter taps, in accordance with some embodiments of the present disclosure. The method 600, at block B602, includes determining a spatial filter for pixels of a rendered frame. For example, for an instance of the process 160, the spatial filter determiner 104 may determine a size (e.g., one or more widths) of the spatial filter 120 for pixels of the image 116 and/or the image 114 based at least in part on render data representative of ray-traced samples of the state of the virtual environment 200.

The method 600, at B604 includes selecting locations of filter taps of the spatial filter that are jittered between rendered frames. For example, for the instance of the process 160, the spatial filter determiner 104 may select locations of the taps 312A, 312B, 312C, 310A, 310B, 310C, 310D, 310E, 310F, and/or 310G, that may correspond to a subset of pixel positions of the spatial filter 120. The locations may be selected, such that the locations of filter taps are jittered between a sequence of rendered frames that each correspond to a respective state of the scene. For example, the spatial filter determiner 104 may jitter an offset and/or other filter tap location selection parameter(s) to determine the locations (e.g., randomly or pseudo-randomly) of the spatial filter 120 for the different rendered frames (e.g., in different instances of the process 160). The spatial filter 120 that corresponds to the image 302 in FIG. 3D may correspond to one of the other rendered frames (e.g., the subsequent frame).

The method 600, at B606 includes applying the spatial filter to the pixels using the filter taps to sparsely sample the pixels. For example, in the instance of the process 160, the image filterer 108 may apply the spatial filter 120 to the pixels using the taps 312A, 312B, 312C, 310A, 310B, 310C, 310D, 310E, 310F, and 310G to sparsely sample data values that correspond to noisy ray-traced samples of lighting conditions of the scene (e.g., of the image 114). As indicated, the method 600 may be repeated (e.g., and/or performed in parallel) for the other rendered frames using different instances of the process 160. The locations of filter taps for the spatial filter 120 may—as various examples—be jittered for every rendered frame, every other rendered frame, for only selected rendered frames, etc.

Figure 7:
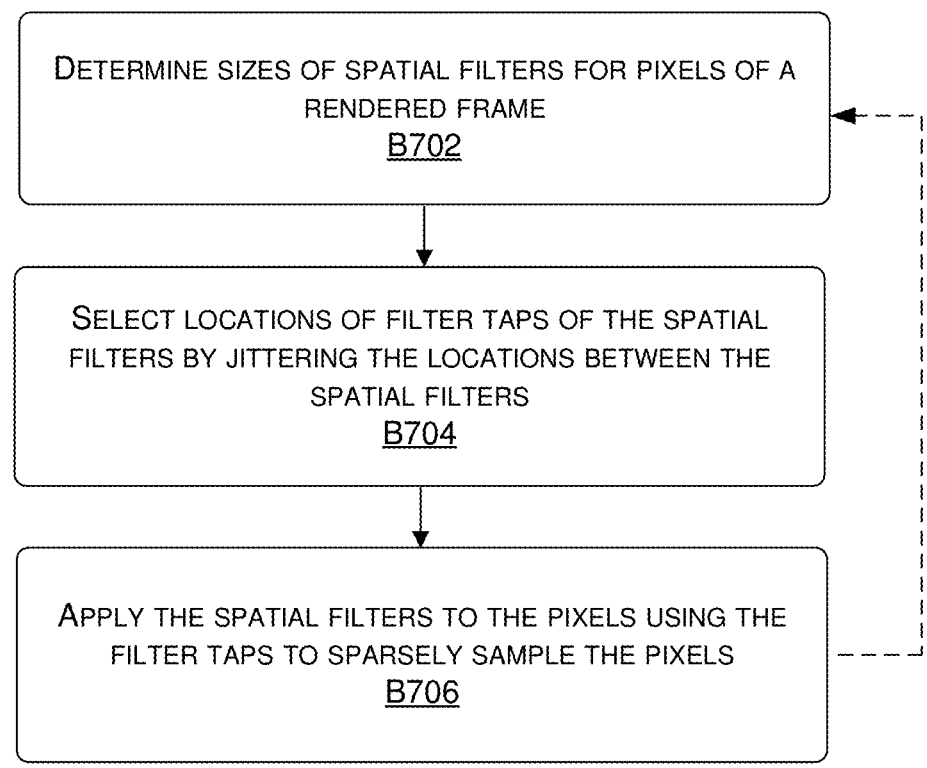
FIG. 7 is a flow diagram showing a method for denoising rendered frames that includes sparsely sampling pixels using spatially jittered locations of filter taps, in accordance with some embodiments of the present disclosure.

FIG. 7 is a flow diagram showing a method 700 for denoising rendered frames that includes sparsely sampling pixels using spatially jittered locations of filter taps, in accordance with some embodiments of the present disclosure. The method 700, at block B702, includes determining sizes of spatial filters for pixels of a rendered frame. For example, for different instances of the process 160 (e.g., performed in parallel) used to generate the image 116, the spatial filter determiner 104 may determine sizes (e.g., one or more widths) of the spatial filter 120 for respective pixels of the image 116 and/or the image 114 based at least in part on render data representative of ray-traced samples of the state of the virtual environment 200.

The method 700, at B704 includes selecting locations of filter taps of the spatial filters by jittering the locations between the spatial filters. For example, for one instance of the process 160, the spatial filter determiner 104 may select locations of the taps 312A, 312B, 312C, 310A, 310B, 310C, 310D, 310E, 310F, and/or 310G, that may correspond to a subset of pixel positions of the spatial filter 120. The spatial filter 120 that corresponds to FIG. 3C may correspond to one of the other spatial filters (e.g., for an adjacent pixel). The locations may be selected, such that the locations of filter taps are jittered between spatial filters. For example, the spatial filter determiner 104 may jitter an offset and/or other filter tap location selection parameter(s) to determine the locations (e.g., randomly or pseudo-randomly) of the spatial filter 120 for the different spatial filters.

The method 700, at B706 includes applying the spatial filters to the pixels using the filter taps to sparsely sample the pixels. For example, for each of the instances of the process 160, the image filterer 108 may apply the spatial filter 120 to the pixels using at least the taps 312A, 312B, 312C, 310A, 310B, 310C, 310D, 310E, 310F, and 310G and the taps shown in FIG. 3D to sparsely sample data values that correspond to noisy ray-traced samples of lighting conditions of the scene (e.g., of the image 114). The locations of filter taps for the spatial filter 120 may—as various examples—be jittered for each spatial filter 120 of a rendered frame, every other spatial filter 120, for only selected (e.g., stochastically) spatial filters 120, etc. As indicated, the method 700 may be repeated (e.g., and/or performed in parallel) for other rendered frames using different instances of the process 160—as various examples—for every rendered frame, every other rendered frame, for only selected rendered frames, etc. Also, the method 700 may be used with the method 600 to spatially jitter and temporally jitter the locations of the filter taps for the spatial filter 120 of the process 160.

Figure 8:
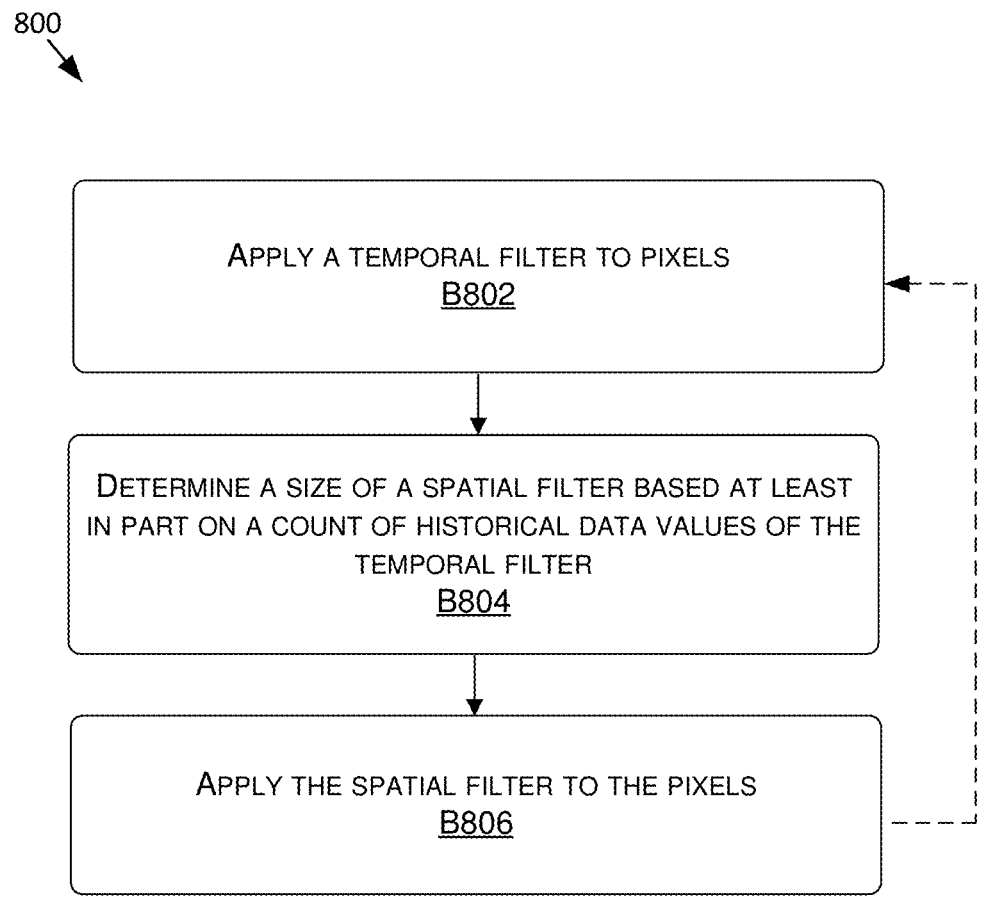
FIG. 8 is a flow diagram showing a method for denoising rendered frames that includes adapting a size of a spatial filter based at least in part on a temporal filter, in accordance with some embodiments of the present disclosure.

FIG. 8 is a flow diagram showing a method 800 for denoising rendered frames that includes adapting a size of a spatial filter based at least in part on a temporal filter, in accordance with some embodiments of the present disclosure. The method 800, at block B802, includes applying a temporal filter to pixels. For example, for an instance of the process 160, the image filterer 108 may apply the temporal filter 126 to data values of pixels of the image 114 and/or the image 116 to generate filtered data values of the pixels.

The method 800, at B804 includes determining a size of a spatial filter based at least in part on a count of historical data values of the temporal filter. For example, the spatial filter determiner 104 may determine, for the instance of the process 160, a size (e.g., one or more widths) of the spatial filter 120 based at least in part on a count of historical data values of the temporal filter 126 that are used to denoise the noisy ray-traced samples of lighting conditions of the scene (e.g., using Equation (2)).

The method 800, at B806 includes applying the spatial filter to the pixels. For example, in the instance of the process 160, the image filterer 108 may apply the spatial filter 120 to the pixels. As indicated, the method 600 may be repeated (e.g., and/or performed in parallel) for other rendered frames and/or for other pixels for the current rendered frame using different instances of the process 160.

Figure 9:
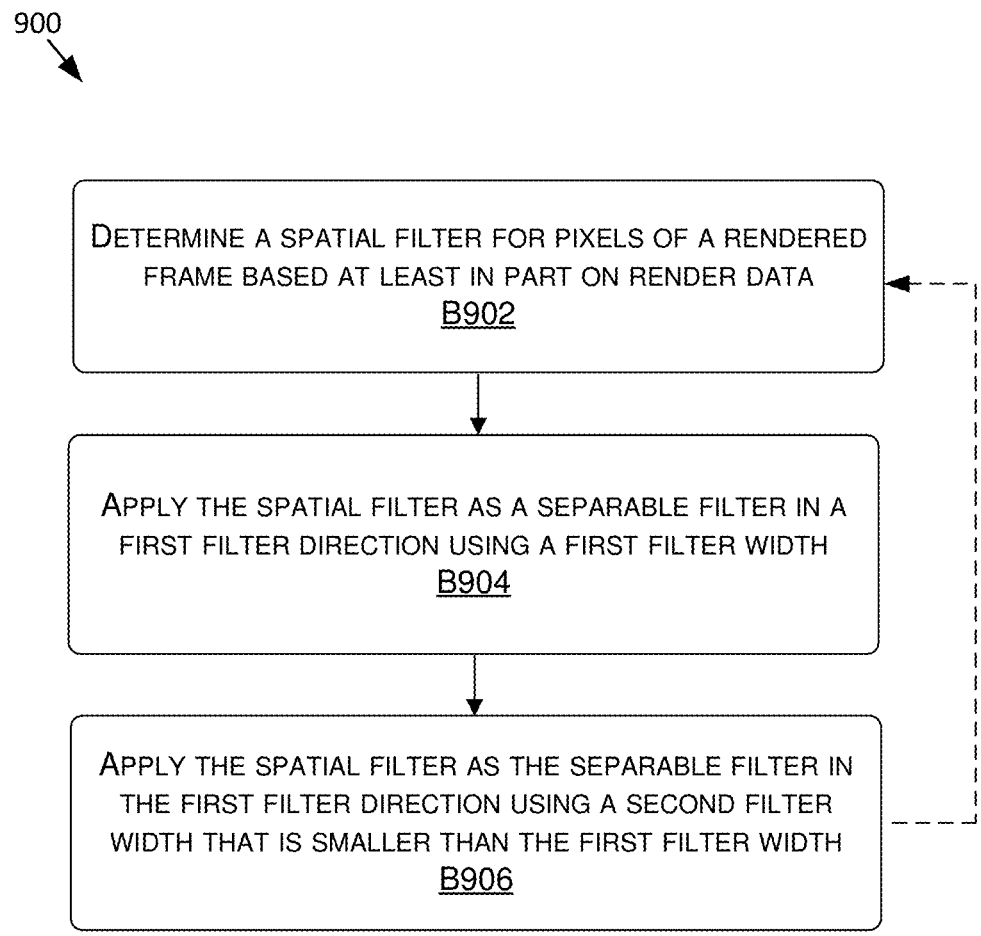
FIG. 9 is a flow diagram showing a method for denoising rendered frames that includes applying a spatial filter as a separable filter using multiple iterations for a filter direction, in accordance with some embodiments of the present disclosure.

FIG. 9 is a flow diagram showing a method 900 for denoising rendered frames that includes applying a spatial filter as a separable filter using multiple iterations for a filter direction, in accordance with some embodiments of the present disclosure. The method 900, at block B902, includes determining a spatial filter for pixels of a rendered frame based at least in part on render data. For example, for an instance of the process 160, the spatial filter determiner 104 may determine the spatial filter 120 for pixels of the image 116 and/or the image 114 based at least in part on render data representative of ray-traced samples of the state of the virtual environment 200.

The method 900, at B904 includes applying the spatial filter as a separable filter in a first filter direction using a first filter width. For example, for the instance of the process 160, the spatial filter determiner 104 may use a filter width of the filter direction 136 to compute a filter width (e.g., using Equation (1)) and corresponding sub-matrix that the image filterer 108 applies in the iteration 400 of FIG. 4. Similarly, for the instance of the process 160, the spatial filter determiner 104 may use a filter width of the filter direction 138 to compute a filter width (e.g., using Equation (1)) and corresponding sub-matrix that the image filterer 108 applies in the iteration 402 of FIG. 4.

The method 900, at B906 includes applying the spatial filter as a separable filter in a first filter direction using a second filter width that is smaller than the first filter width. For example, for the instance of the process 160, the spatial filter determiner 104 may use the filter width of the filter direction 136 to compute a filter width (e.g., using Equation (1)) and corresponding sub-matrix that the image filterer 108 applies in the iteration 404 of FIG. 4. Similarly, for the instance of the process 160, the spatial filter determiner 104 may use the filter width of the filter direction 138 to compute a filter width (e.g., using Equation (1)) and corresponding sub-matrix that the image filterer 108 applies in the iteration 406 of FIG. 4.

Figure 10:
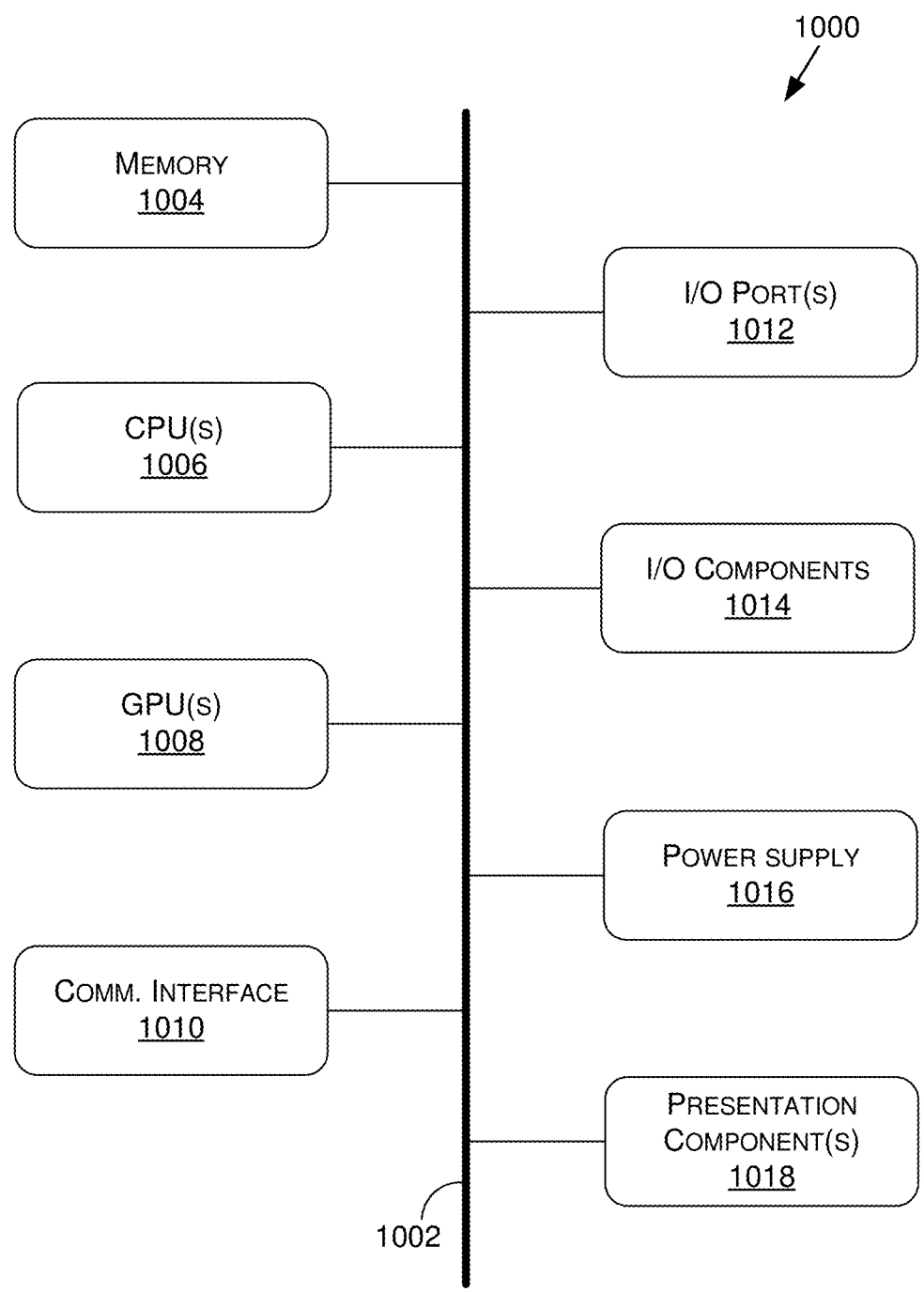
FIG. 10 is a block diagram of an example computing device suitable for use in implementing some embodiments of the present disclosure.

FIG. 10 is a block diagram of an example computing device 1000 suitable for use in implementing some embodiments of the present disclosure. Computing device 1000 may include a bus 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, and one or more presentation components 1018 (e.g., display(s)).

Although the various blocks of FIG. 10 are shown as connected via the bus 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The bus 1002 may represent one or more busses, such as an address bus, a data bus, a control bus, or a combination thereof. The bus 1002 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

The GPU(s) 1008 may be used by the computing device 1000 to render graphics (e.g., 3D graphics). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data. The display memory may be included as part of the memory 1004. The GPU(s) 1008 may include two or more GPUs operating in parallel (e.g., via a link). When combined together, each GPU 1008 may generate pixel data for different portions of an output image or for different output images (e.g., a first GPU for a first image and a second GPU for a second image). Each GPU may include its own memory, or may share memory with other GPUs.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   generating rendered frames of a scene using locations of filter taps of spatial filters that are jittered, wherein for each rendered frame of a plurality of the rendered frames, generating the rendered frame comprises:
   determining a size of a spatial filter of the spatial filters for pixels of the rendered frame based at least in part on render data representative of ray-traced samples of the scene;
   selecting the locations of the filter taps of the spatial filter that correspond to a subset of pixel positions of the spatial filter based at least in part on jittering at least one location corresponding to at least one selection parameter between the spatial filters; and
   applying the spatial filter to the pixels using the filter taps to sparsely sample data values within the spatial filter that correspond to ray-traced samples of lighting conditions of the scene.

2. The method of claim 1, wherein the jittering comprises randomly or pseudo-randomly determining the at least one selection parameter between the plurality of rendered frames.

3. The method of claim 1, wherein a plurality of the spatial filters are applied to different pixels to generate the rendered frame, and the locations of the filter taps for each of the plurality of spatial filters are jittered between the plurality of the spatial filters.

4. The method of claim 1, wherein the spatial filter is a separable filter having a first filter direction and a second filter direction, and the selecting of the filter taps comprises:
   selecting a first subset of the filter taps along the first filter direction; and
   selecting a second subset of the filter taps along the second filter direction.

5. The method of claim 1, wherein the spatial filter is a separable filter having a first filter direction having a first number of the filter taps that is different than a second number of the filter taps of a second filter direction of the spatial filter.

6. The method of claim 1, wherein the spatial filter is a separable filter, and the applying of the separable filter in a filter direction is performed over multiple iterations using reducing filter widths.

7. The method of claim 1, wherein the generating of the rendered frame further comprises applying a temporal filter to the pixels using historical data values of the pixels, wherein the size of the spatial filter is further based at least in part on a count of the historical data values.

8. The method of claim 1, wherein the determining of the size of the spatial filter is based at least in part on a hit distance between a point on a surface of the scene and another object in the scene.

9. The method of claim 1, wherein the spatial filter of each of the plurality of the rendered frames is applied to a same pixel at an initial pixel position of the spatial filter.

10. The method of claim 1, wherein the ray-traced samples of lighting conditions of the scene are selected from a group consisting of:
    ray-traced shadow samples of the pixels;
    ray-traced reflection samples of the pixels;
    ray-traced ambient occlusion samples of the pixels; and
    ray-traced global illumination samples of the pixels.

11. A method comprising:
    determining sizes of spatial filters for respective pixels of a rendered frame of a scene based at least in part on render data representative of ray-traced samples of a state of the scene;
    selecting, for each spatial filter of a plurality of the spatial filters, locations of filter taps of the spatial filter that correspond to a subset of pixel positions of the spatial filter based at least in part on littering at least one filter tap location selection parameter corresponding to the locations between the spatial filters; and
    applying the spatial filters to the respective pixels of the rendered frame using the filter taps of the spatial filters to sparsely sample data values within the spatial filters that correspond to ray-traced samples of lighting conditions of the state of the scene.

12. The method of claim 11, wherein the at least one filter tap location selection parameter is jittered randomly or pseudo-randomly.

13. The method of claim 11, wherein the spatial filter is of a plurality of spatial filters applied to pixels of different rendered frames of the scene that include the rendered frame, and locations of filters taps for each of the plurality of spatial filters are determined based at least in part on the at least one filter tap location selection parameter jittered between the rendered frames.

14. The method of claim 11, further comprising applying the temporal filters to the respective pixels of the rendered frame using historical data values of the respective pixels, wherein the sizes of the spatial filters are further based at least in part on corresponding counts of the historical data values.

15. A method comprising:
  applying a temporal filter to data values of pixels of a rendered frame to generate filtered data values of the pixels, the data values corresponding to first ray-traced samples of lighting conditions of a state of a scene;
  determining a size of a spatial filter based at least in part on a count of historical data values of the temporal filter, the historical data values corresponding to second ray-traced samples of lighting conditions of historical states of the scene; and
  applying the spatial filter to the filtered data values of the pixels.

16. The method of claim 15, wherein the applying of the temporal filter clamps a filtered data value of a pixel to a range of values that is based at least in part on at least one of a local mean or a local variance of at least some of the data values for a defined region of the pixels that surrounds the pixel.

17. The method of claim 15, further comprising filtering at least a historical data value of the historical data values in association with a pixel to generate the temporal filter, the filtering based at least in part on a difference between a first surface normal value associated with the historical data value and a second surface normal value associated with a data value of the data values, the data value being of the pixel.

18. The method of claim 15, wherein the count of historical data values corresponds to a number of rendered frames used to generate the historical data values and each state of the historical states corresponds to a respective rendered frame of the rendered frames.

19. The method of claim 15, wherein the size of the spatial filter is computed using an equation that causes the size to be inversely correlated with the count of historical pixel values.

20. The method of claim 15, wherein the size of the spatial filter is further based at least in part on render data representative of ray-traced samples of the state of the scene.

* * * * *